United States Patent
Kara

(10) Patent No.: US 6,233,568 B1
(45) Date of Patent: May 15, 2001

(54) SYSTEM AND METHOD FOR AUTOMATICALLY PROVIDING SHIPPING/TRANSPORTATION FEES

(75) Inventor: Salim G. Kara, Markham (CA)

(73) Assignee: E-Stamp Corporation, Mountain View, CA (US)

( * ) Notice: Subject to any disclaimer, the term of this patent is extended or adjusted under 35 U.S.C. 154(b) by 0 days.

(21) Appl. No.: 09/106,997

(22) Filed: Jun. 29, 1998

Related U.S. Application Data

(63) Continuation-in-part of application No. 08/796,275, filed on Feb. 7, 1997, now Pat. No. 5,774,886, which is a continuation of application No. 08/639,847, filed on Apr. 19, 1996, now Pat. No. 5,682,318, which is a continuation of application No. 08/176,716, filed on Jan. 3, 1994, now Pat. No. 5,510,992.

(51) Int. Cl.[7] .................................................. G07B 17/00
(52) U.S. Cl. ............................................ 705/410; 705/401
(58) Field of Search ............................. 705/30, 401, 404, 705/410

(56) References Cited

U.S. PATENT DOCUMENTS

| | | | | |
|---|---|---|---|---|
| 4,122,532 | * | 10/1978 | Dlugos et al. ........................ | 705/409 |
| 4,495,581 | * | 1/1985 | Piccione ............................... | 705/402 |
| 4,802,218 | * | 1/1989 | Wright et al. ......................... | 705/60 |
| 4,809,185 | * | 2/1989 | Talmadge .............................. | 705/403 |
| 4,812,994 | * | 3/1989 | Taylor et al. ......................... | 705/410 |
| 4,831,555 | * | 5/1989 | Sansone et al. ...................... | 358/1.14 |
| 4,864,618 | * | 9/1989 | Wright et al. ......................... | 380/51 |
| 4,868,757 | * | 9/1989 | Gil ....................................... | 705/406 |
| 4,900,903 | * | 2/1990 | Wright et al. ......................... | 235/380 |
| 4,900,904 | * | 2/1990 | Wright et al. ......................... | 235/380 |
| 4,901,241 | * | 2/1990 | Schneck ................................ | 705/401 |
| 4,908,770 | * | 3/1990 | Breault et al. ........................ | 705/404 |
| 4,980,542 | * | 12/1990 | Jackson et al. ....................... | 235/375 |
| 5,025,141 | * | 6/1991 | Bolan ................................... | 235/472.03 |
| 5,040,132 | * | 8/1991 | Schuricht et al. .................... | 707/507 |
| 5,091,771 | * | 2/1992 | Bolan et al. .......................... | 361/751 |
| 5,111,030 | * | 5/1992 | Brasington et al. .................. | 235/375 |
| 5,117,364 | * | 5/1992 | Barns-Slavin et al. .............. | 705/402 |
| 5,319,562 | * | 6/1994 | Whitehouse .......................... | 705/403 |
| 5,481,464 | * | 1/1996 | Ramsden .............................. | 705/407 |
| 5,485,369 | | 1/1996 | Nicholls et al. ...................... | 364/401 |
| 5,510,992 | * | 4/1996 | Kara .................................... | 705/408 |

(List continued on next page.)

FOREIGN PATENT DOCUMENTS

0805422 A2 * 11/1997 (EP) .

OTHER PUBLICATIONS

"UPS Advances E–commerce Strategy with Next–Generation Web Tools". PR Newswire, Apr. 6, 1999, p. 4782.*

"OR 191–08 Pitney Online Stamps Get USPS Nod (Pitney Bowes gets US Postal Service (USPS) approval to launch its first Internet postage product, ClickStamp Online", Online Reporter, Apr. 3, 2000.*

"Miniature, Coin–shaped Chip is Read or Written with a Touch"; News Release, Dallas Semiconductor; Jul. 1991.*

Primary Examiner—Edward R. Cosimano
(74) Attorney, Agent, or Firm—Fulbright & Jaworski L.L.P.

(57) ABSTRACT

There is disclosed a system and method for dispensing postage or other authorization information electronically by using a portable processor containing a maximum amount of preauthorized postage which can be applied to any piece of mail or other item. A plurality of shipping service providers may utilize the portable processor to store and dispense credit value for authorization of various shipping services. Accordingly, a user is presented with information regarding various shipping service providers fees and/or services associated with particular shipping/delivery parameters desired by the user in order to make an informed choice as to a most preferable method of shipment.

47 Claims, 23 Drawing Sheets

U.S. PATENT DOCUMENTS

| | | | | |
|---|---|---|---|---|
| 5,544,246 | * | 8/1996 | Madelbaum et al. | 235/380 |
| 5,563,395 | * | 10/1996 | Hoshino | 235/380 |
| 5,602,742 | | 2/1997 | Solondz et al. | 364/464.2 |
| 5,606,507 | * | 2/1997 | Kara | 705/408 |
| 5,631,827 | | 5/1997 | Nicholls et al. | 395/228 |
| 5,656,799 | * | 8/1997 | Ramsden et al. | 177/2 |
| 5,682,318 | * | 10/1997 | Kara | 705/402 |
| 5,699,258 | * | 12/1997 | Thiel | 705/409 |
| 5,710,706 | * | 1/1998 | Markl et al. | 705/409 |
| 5,729,459 | * | 3/1998 | Brandien et al. | 705/402 |
| 5,774,886 | * | 6/1998 | Kara | 705/410 |
| 5,778,076 | * | 7/1998 | Kara et al. | 380/51 |
| 5,796,834 | * | 8/1998 | Whitney et al. | 705/60 |
| 5,822,739 | * | 10/1998 | Kara | 705/410 |
| 5,831,220 | * | 11/1998 | Ramsden et al. | 177/4 |
| 5,841,076 | * | 11/1998 | Schwartz et al. | 177/25.13 |
| 6,035,291 | * | 3/2000 | Thiel | 705/408 |
| 6,041,318 | * | 3/2000 | Danford-Klein et al. | 705/400 |
| 6,047,271 | * | 4/2000 | Danford-Klein et al. | 705/400 |

* cited by examiner

"E-Stamp" - Post N Mail, Inc.

201 {
Software installation & screen prompts.
1. Insert disk 1 in drive.
2. Select Run...from File Menu in Program Manager
3. Type b:\setup and click O.K. (substitute b for correct drive)
4. Follow instructions on screen.

Screen 1.
203

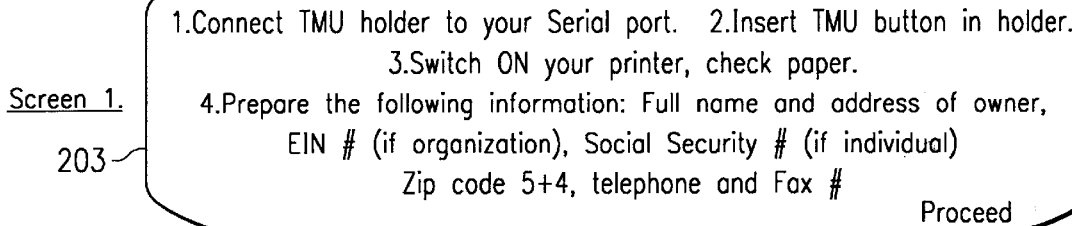
1. Connect TMU holder to your Serial port.  2. Insert TMU button in holder.
3. Switch ON your printer, check paper.
4. Prepare the following information: Full name and address of owner,
EIN # (if organization), Social Security # (if individual)
Zip code 5+4, telephone and Fax #
Proceed Screen 2.
205

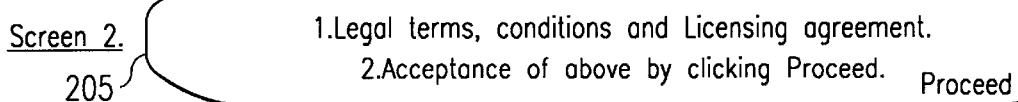
1. Legal terms, conditions and Licensing agreement.
2. Acceptance of above by clicking Proceed.   Proceed Screen 3.
207

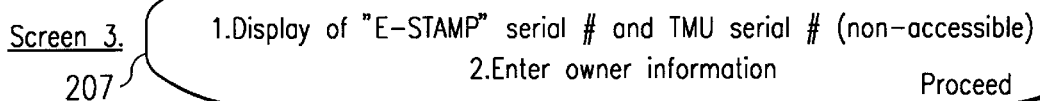
1. Display of "E-STAMP" serial # and TMU serial # (non-accessible)
2. Enter owner information   Proceed Screen 4.
209

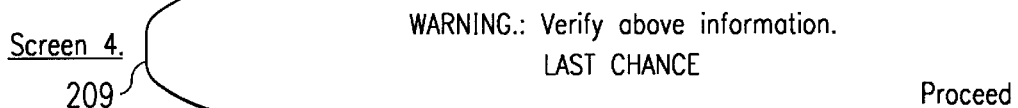
WARNING.: Verify above information.
LAST CHANCE
Proceed

Screen 5.
211

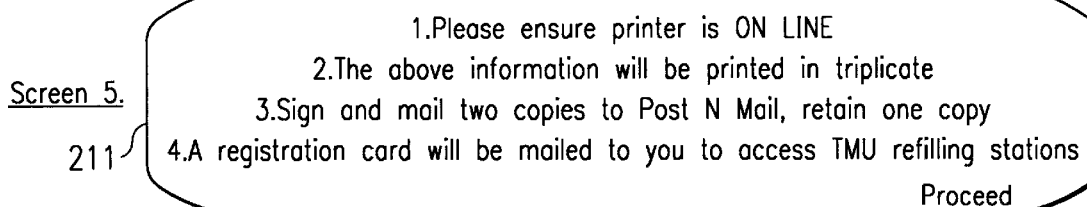
1. Please ensure printer is ON LINE
2. The above information will be printed in triplicate
3. Sign and mail two copies to Post N Mail, retain one copy
4. A registration card will be mailed to you to access TMU refilling stations
Proceed Screen 6.
213

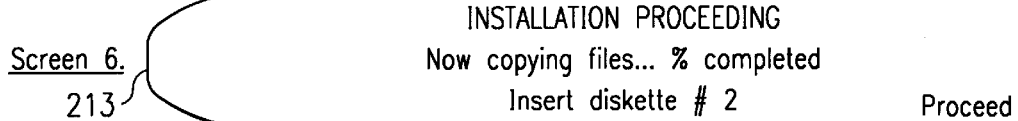
INSTALLATION PROCEEDING
Now copying files... % completed
Insert diskette # 2   Proceed Screen 7.
215

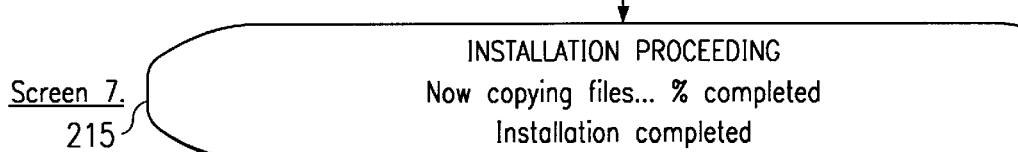
INSTALLATION PROCEEDING
Now copying files... % completed
Installation completed

FIG. 2

Post N Mail, Inc.  Telephone (713)583-8909 Fax (713)699-0101
505 Cypress Station Dr. Suite # 505
Houston, Tx 77030-1612

"E-Stamp"™ - Registration form

31 — T.M.U. Button Serial  #000000001        Date: April 20, 1994  ⎫
32 — E-Stamp Serial         #000000001        Time: 01:29 AM        ⎬ 33
                                                                    ⎭

35 ⎧ Registered user:
   ⎪ Individual      Salim G. Kara         Social Security # 636-18-0137
   ⎨ Organization    Global Impex, Inc.    Employer I.N. # 76-0422781
   ⎪ Address:        505 Cypress Station Dr.
   ⎪                 Suite #505
   ⎪ City:           Houston      State: Tx    Zipcode+4: 77090-1612
   ⎩ Telephone: (713)583-8909    Fax: (713)699-0101

Post N Mail License Agreement

38 ⎧ This is a legal agreement between you (an individual or an entity), the end user, and
   ⎪ Post N Mail, Inc. If you do not agree to the terms of this Agreement, promptly return
   ⎪ the disk package and accompanying items (including all hardware, written materials and
   ⎪ binders or other containers) to the place you obtained them for a full refund.
   ⎨ License
   ⎪ 1. Grant of License.
   ⎪ 2. Term of License.
   ⎪ 3. Copyright.
   ⎪ 4. Other restrictions.
   ⎪ 5. Limited warranty.
   ⎪ 6. Customer remedies.
   ⎪ 7. No Other Warranties.
   ⎩ 8. No Liability for Consequential Damages.

308
_____/
Signature

FIG. 3A

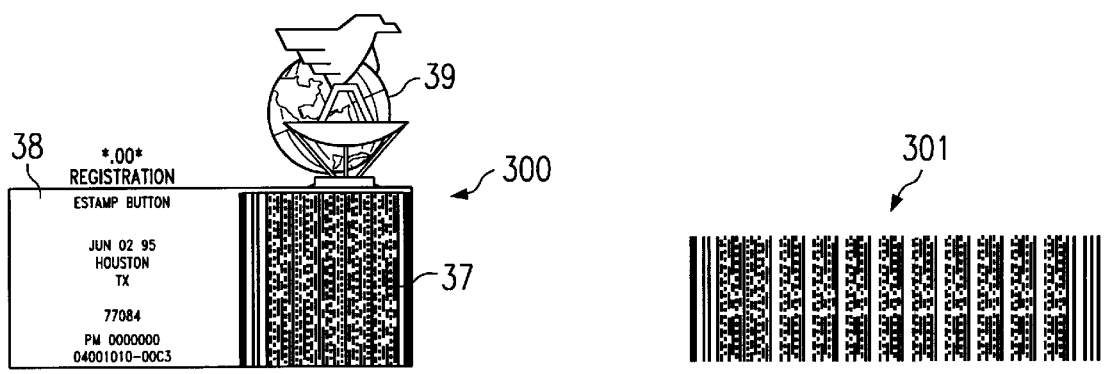

FIG. 3B

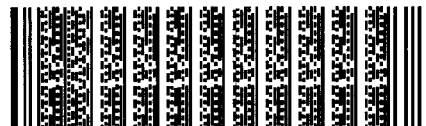

FIG. 3C

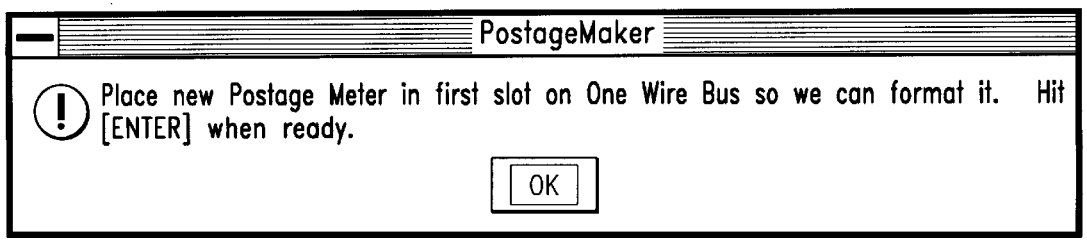

FIG. 4H

```
RECEIPT                          RECEIPT NO:              AG7654321
POSTAGE BUTTON REFILL SERVICES                                 5/25
TRANSACTION:
  AUTHORIZATION CODE: MA1234567      TRANSACTION DATE: 5/25/95
                                     TRANSACTION TYPE: INITIALIZE
                                     TRANSACTION AMOUNT:      2.00
POSTAGE BUTTON:
       SERIAL NO: 0800101000E0                OWNER:
                                         OWNER ZIP CODE:
                                      TRANSACTION COUNTER: 00
                               REMAINING CREDIT BALANCE:     2.00
```

FIG. 4I

Add Postage to a Button

Button information
- Button Serial No.: 0800101000E0     Name:
- PNM Registration No.:               Zip Code:
- Last Access On: 05/25/95            Expires On: 08/23/95
- Remaining Balance: $2.00

Add Postage
- Current Balance: $2.00
- Transaction Balance: 100

Button Refill Information
- Refill Date: 05/25/95               Refill Time: 12:37 PM
- Site ID: 000001                     Workstation 1
- Refill Balance:

[ OK ]   [ Accept ]   [ Re-Enter ]   [ Cancel ]

FIG. 4J

Add Postage to a Button

Button information
- Button Serial No.: 0800101000E0
- Name: Paul Alto
- PNM Registration No.:
- Zip Code: 77026-4217
- Last Access On: 05/25/95
- Expires On: 08/23/95
- Remaining Balance: $2.00

Add Postage
- Current Balance: $102.09
- Transaction Balance: [    ]

Button Refill Information
- Refill Date: 05/25/95
- Refill Time: 12:37 PM
- Site ID: 000001
- Workstation 1
- Refill Balance:

[ OK ]  [ Accept ]  [ Re-Enter ]  [ Cancel ]

Add Postage to a Button

Button information
- Button Serial No.: 0800101000E0
- Name:
- PNM Registration No.:
- Zip Code:
- Last Access On: 05/25/95
- Expires On: 08/23/95
- Remaining Balance: $2.00

Add Postage
- Current Balance: $2.00
- Transaction Balance: 100

Button Refill Information
- Refill Date: 05/25/95
- Refill Time: 12:37 PM
- Site ID: 000001
- Workstation 1
- Refill Balance: $102.00

[ OK ]  [ Accept ]  [ Re-Enter ]  [ Cancel ]

*FIG. 4L*

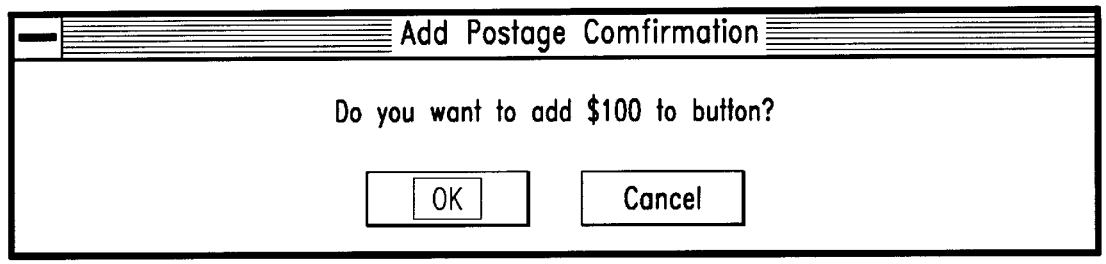
FIG. 4M
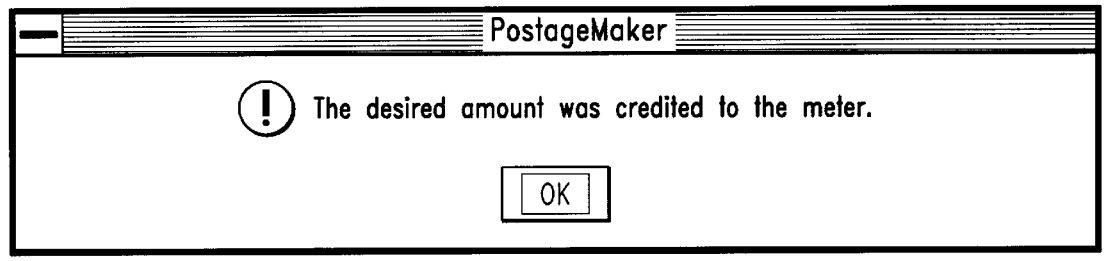
FIG. 4N
| RECEIPT | RECEIPT NO: | AG7654321 |
POSTAGE BUTTON REFILL SERVICES                                    5/25
TRANSACTION:
  AUTHORIZATION CODE: MA1234567    TRANSACTION DATE: 5/25/95
                                                   TRANSACTION TYPE: CREDIT
                                                   TRANSACTION AMOUNT:      100.00
POSTAGE BUTTON:
        SERIAL NO: 0800101000E0                 OWNER:
                                                OWNER ZIP CODE:
                                        TRANSACTION COUNTER: 01
                                REMAINING CREDIT BALANCE:      102.00
FIG. 4O

E-Stamp-(Form)

File  Edit  Layout  Help

- Background On
- ✓ Background Off
- Print...                    Ctrl+P
- Print Preview
- Print Setup...
- Verify Addresses
- Connect Other Data...
- Import Yellow
- Export Yellow
- Import White
- Export White
- View Log file
- Print Log file
- Print Preview Log File
- Exit

Address To

| Name: | Mr. Jack T. Trotter |
| Company: | FALCON 900 INTERNATIONAL | Suite 250 |
| Address 1: | 1000 Louisiana, Suite 3600 |
| Address 2: | |
| City: | Houston |
| State: | TX |
| Zip: | 77002 | +4: | 1212 | 22-2516 |
| Country: | |

Browse  Save  Font  Add  Save  Delete

○ Barcode to right
○ Barcode above

Urgency

- ☐ Same day
- ☒ Overnight
- ☐ Next day
- ☐ 2 Days
- ☐ 3 Days
- ☐ Immaterial

Selection & Comparison

- ☐ US Post          $
- ☐ Federal Express  $
- ☐ DHL              $
- ☐ UPS              $
- ☐ Purolator        $
- ☐ Emery            $

Label

Starting position: 1   Set label position

Button Status

Amount Remaining: $1001.680

Button OK.

Postage

Calculated  $0.320

☐ Manual

Mail

Pounds       Ounces
              1

Weight:
Zone: LOCAL
Class: FIRST

● Domestic  ○ International

Ready                                                    NUM

BLOCK DIAGRAM OF MEMORY LAYOUT FOR PREFERRED
EMBODIMENT OF PORTABLE POSTAGE PROCESSOR

---

3k BYTES NON-VOLATILE STATIC RAM

| | |
|---|---|
| CREATION DATE/TIME | CURRENT BALANCE |
| CREATING AGENT ID | STRIKE COUNTER |
| BUTTON TYPE: (POSTAGE) | BALANCE BEFORE LAST REFILL |
| PASSWORD | LAST REFILL DATE |
| USER REGISTRATION ID | LAST REFILL AMOUNT |
| USER NAME | LAST REFILL AGENT ID |
| USER ADDRESS | LAST REFILL POSTAL LOCATION ID |
| USER STATE | LAST REFILL STATION NUMBER |
| USER ZIP | TRANSACTION LOG |
| USER PHONE | EVENT LOG |
| USER FAX | ENCRYPTION KEYS |

BLOCK DIAGRAM OF MEMORY LAYOUT FOR PREFERRED EMBODIMENT OF
PORTABLE SECURITY DEVICE PROCESSOR FOR AGENT AND MASTER

3k BYTES NON-VOLATILE STATIC RAM

| | |
|---|---|
| CREATION DATE/TIME | TRANSACTION LOG |
| CREATING MASTER ID | EVENT LOG |
| BUTTON TYPE: (AGNT OR MSTR) | ENCRYPTION KEYS |
| PASSWORD | |
| AGENT REGISTRATION ID | |
| AGENT NAME | |
| AGENT LOCATION ADDRESS | |
| AGENT STATE | |
| AGENT ZIP | |
| AGENT PHONE | |

*FIG. 13*   1301

SECURE METER PROCESS LOOP

SYSTEM AND METHOD FOR AUTOMATICALLY PROVIDING SHIPPING/TRANSPORTATION FEES

REFERENCE TO RELATED APPLICATIONS

The present application is a continuation-in-part of pending application Ser. No. 08/796,275, entitled "SYSTEM AND METHOD FOR PROVIDING DISPOSABLE ELECTRONIC POSTAGE," filed Feb. 7, 1997, now U.S. Pat. No. 5,774,886 which in turn is a continuation application of application Ser. No. 08/639,847, entitled "SYSTEM AND METHOD FOR STORING POSTAGE IN A COMPUTER SYSTEM," filed Apr. 19, 1996, now U.S. Pat. No. 5,682,318, which is a continuation application of application Ser. No. 08/176,716, entitled "SYSTEM AND METHOD FOR AUTOMATICALLY PRINTING POSTAGE ON MAIL," filed Jan. 3, 1994, now U.S. Pat. No. 5,510,992, the disclosures of which are incorporated herein by reference.

Reference is hereby made to co-pending and commonly assigned U.S. patent applications application Ser. No. 08/725,119, entitled "SYSTEM AND METHOD FOR REMOTE POSTAGE METERING", filed Oct. 2, 1996, now U.S. Pat. No. 5,822,739 application Ser. No. 08/965,069 entitled "SYSTEM AND METHOD FOR PROVIDING FAULT TOLERANT TRANSACTIONS OVER AN UNSECURED COMMUNICATION CHANNEL," filed Nov. 5, 1997, application Ser. No. 08/812,803, entitled "SYSTEM AND METHOD FOR CONTROLLING THE DISPENSING OF AN AUTHENTICATED INDICIA," filed Mar. 6, 1997, now U.S. Pat. No. 5,796,834 which is a continuation application of pending application Ser. No. 08/516,010, entitled "SYSTEM AND METHOD FOR CONTROLLING THE DISPENSING OF AN AUTHENTICATING INDICIA," filed Aug. 16, 1995, now U.S. Pat. No. 5,778,079 which is a continuation-in-part application of application Ser. No. 08/263,751, entitled "SYSTEM AND METHOD FOR STORING, RETRIEVING AND AUTOMATICALLY PRINTING POSTAGE ON MAIL," filed Jun. 22, 1994, now U.S. Pat. No. 5,606,507, which in turn is a continuation-in-part application of application Ser. No. 08/176,716, entitled "SYSTEM AND METHOD FOR AUTOMATICALLY PRINTING POSTAGE ON MAIL," filed Jan. 3, 1994, now U.S. Pat. No. 5,510,992, the disclosures of which are all incorporated herein by reference.

TECHNICAL FIELD OF THE INVENTION

This invention relates in general to the provision of and accounting for fees associated with the pick-up, shipping, and delivery of articles, such as mail, via services such as a postal system. More particularly, the invention relates to a system and method under the control of a computer for automatically establishing payment of fees, such as through the use of an indicia that can be used to authenticate a postage or similar transaction, or the obligation to pay such fees, for a plurality of shipping service providers.

BACKGROUND OF THE INVENTION

Presently, it is common for individuals or businesses to have residing within their offices a postage meter rented from a commercial business. This arrangement is very convenient, since letters may be addressed, postage applied, and mailed directly from the office without requiring an employee to physically visit the U.S. Post Office and wait in line in order to apply postage to what is often a quite significant volume of outgoing mail, or to manually apply stamps to each piece of mail.

Quite naturally, postage meters were developed to relieve the manual application of stamps on mail and to automate the above process. Nevertheless, a postage meter residing within an office is not as convenient and efficient as it may first seem to be. First, a postage meter may not be purchased, but must be rented. The rental fees alone are typically not insignificant. For a small business, this can be quite an expense to incur year after year. Second, a postage meter must be adjusted, serviced and replenished manually; e.g., each day the date must be adjusted manually, periodically the stamp pad must be re-inked, and when the amount of postage programmed within the postage meter has expired, the postage in the meter must be replenished. To be replenished, a postage meter must be manually unplugged, placed into a special case (the meter is of a significant weight), and an employee must visit a U.S. Post Office to have the meter reprogrammed with additional postage. Upon arrival at the U.S. Post Office, a teller must cut the seal, replenish the meter with a desired amount of postage, and reseal the meter before returning it to the employee. The meter must then be returned to the office and powered up.

Thus, in addition to the monthly rent, the servicing and replenishing of the meter requires the time and expense of at least one employee to take the meter to the U.S. Post Office to have it replenished. Of course, this procedure results in down-time wherein the postage meter is not available to the business for the application of postage to outgoing mail. In addition, because of the monthly rent and the size of these devices, it is generally not practical for businesses to have more than one postage meter to alleviate this down-time.

Another type of meter, offered at slightly more expense, works in the following manner: 1) a user sets up an account with the meter owner, 2) 7 to 10 days before a user requires more postage, the user deposits with the meter owner the amount of postage required, 3) the user then calls the owner (7 to 10 days later) and they issue instructions as to the manual pushing of a variety of buttons on the meter (programming) which will replenish the postage amount on the meter. Nonetheless, the meter must be taken to the Post Office every 6 months for servicing in order to detect any tampering.

Lastly, there is nothing inherent in the postal meter system which inhibits fraud. Accordingly, there may be a considerable amount of revenues lost for a postal service, or other item shipping service provider, before meter fraud is detected.

An alternative to the above mentioned postage meters available to a business, especially a small business, is to forego the advantages of a postage meter and to buy sheets, or books, of stamps. Without a doubt, this is not a sufficient solution. Since a variety of denominations of stamps are generally required, applying two 29¢ stamps to a letter requiring only 40¢, will begin to add up over time. Additionally, it is difficult for a business to keep track of stamp inventories and stamps are subject to pilferage and degeneration from faulty handling. Moreover, increases in the postal rate (which seem to occur roughly every three years) and the requirement for variable amounts of postage for international mail, makes the purchase of stamps even more inefficient and uneconomical.

Because of different postage zones, different classes of mail, different postage required by international mail and the inefficiency of maintaining stamps within an office, it is important to have an automatic postage system, such as the aforementioned inefficient and relatively expensive postage meter.

Moreover, there may be a variety of item shipping or delivery service providers, each of which requires payment for pick-up, transportation, and/or delivery of items according to different schedules and terms. Accordingly, to automate shipping of items via ones of these services may require a business to rent or purchase, and operate and maintain a variety of metering devices, or other equipment such as printers for waybills, manifests, or bills of lading, in order to have the flexibility to ship items via these various services.

Often shipping items via different services is desired due to such considerations as the availability of a particular service offered, guaranteed delivery day or time, tracking of shipped items, delivery enhancements including C.O.D., certified, or return receipt, as well as cost considerations. However, a small business may forgo the flexibility to choose a shipper based on such considerations due to the expense and complexity of implementing the infrastructure necessary to utilize the various services. Moreover, a typical casual user of shipping services will not invest the time into determining the particular shipper and/or service offered which most closely satisfies the user's needs and desires.

Additionally, the shipping service providers may be hesitant to offer or provide automated metering, or other such equipment, to less than heavy commercial users of their service due to expense, training, and support issues. Accordingly, such shipping service providers may not effectively leverage a potentially large portion of their potential market and, instead, rely on less convenient and, thus, less likely to be utilized manual and/or difficult to use methods of providing service to this portion of the market. Additionally, such systems may present fee collection problems as the shipping service providers may have to establish accounts, either prepaid or postpaid, in order to service these accounts. Postpaid accounts may introduce latencies in actually receiving payment for services already rendered in addition to the inability to collect for some services rendered. Prepaid accounts, although alleviating risks involved with collecting fees for services already rendered and latencies in receiving payment, introduces costs in handling such accounts.

Accordingly, there is a need in the art for a system and method that provides the automatic placement of postage or other proof of payment or obligation to make payment for services, i.e., conducting a credit transaction without deducting a value from a credit balance (credit transaction), associated with item shipping/delivery on mail and other items at locations other than a U.S. Post Office or other shipping service provider, while not requiring the use of a traditional postage meter. There is a further need in the art for such a system to provide for the placement of such proof of payment or obligation to make payment for a variety of different shipping/delivery services in order that a user may select a delivery service provider and/or particular service most advantageous to that user's needs and desires.

However, one major problem with any system in which a single apparatus is utilized in conjunction with providing accounting for fees associated with a plurality of different service providers is the maintenance of strict controls on the "filling" of the memory with value credit and/or tracking the fees to be paid authorized by the apparatus. Any such controls should have as a component the ability to create an audit trail and the ability to withstand unauthorized usage.

Another problem facing any system storing and authorizing postage or other proof of payment is that the system should optimally interface with a user friendly operating environment that is flexible and can be coupled to other programs such as a word processing or graphics program.

It is a primary object of this invention to provide a system and method to dispense postage, or other proof of payment or obligation to make payment, in a secure manner so that it can be authenticated on a piece-by-piece basis.

It is a further object of this invention to dispense postage, or other proof of payment or obligation to make payment, authorized for use with and by a variety of service providers.

Another object of the invention is allow the comparison of fees/charges as between various ones of the service providers in order to provide a user with sufficient information to select a shipping/delivery service provider and/or particular service best suited to the needs and desires of the users.

A further object of the invention is to provide a system and method which may be managed by a single service provider although providing authorized proof of payment for a variety of service providers.

SUMMARY OF THE INVENTION

These and other objects and advantages are present wherein a portable device is constructed with a memory and having a processor controlling that memory. The device is arranged to communicate with a general purpose processor-based system, such as a personal computer (PC), in order to exchange instructions therewith.

The portable processor device has on board certain security related fields, such as the date and time, the balance, random number generators, number of transactions that have taken place on the device, and the serial number of the device. It also has on board when the user initializes the device, information about the owner of the device including his/her name, the registration number and other information about the owner such as the user's address and password.

When the device is used and a transaction is about to be debited from the device or an indication of an obligation to pay for shipping services (credit transaction) is about to be stored in the device, information about the transaction, such as the debit or credit amount and/or other transaction information that is postage or shipping related, such as the addressee's ZIP code, the addressor's ZIP code, the recipient's address and name, the mail class, etc., are uploaded to the device from the PC. The processor stores them in memory, then it takes this information, the owner information and transaction information and preferably digitally signs them in a security packet, using its own key which is on board the device (it is not given externally). Once the debit or credit transaction has taken place, the device gives data back to the PC in digitally signed form. The PC then takes that information and packages it into an indicia in the form of a portable data file so that the digitally signed information can then be authenticated by the authenticating agency at pick-up, during shipment, or after it has been delivered along with a document or other associated item.

The processor device preferably stores an amount of credit from which the debit amount is deducted. This credit is accessible only through the processor of the device and, thus, is secure. Accordingly, a single trusted service provider, such as the United States Postal Service, may exclusively possess the corresponding apparatus and methods in order to refill or otherwise increment the stored credit upon payment by a user. As such, additional service providers may delegate the implementation of such an automated system to this trusted service provider and receive payment of fees therefrom when the transaction information stored by the device indicates use of such other service providers.

Of course, other service providers may be provided access to the internal workings of the device for direct management of transactions associated with such service providers. For example, an alternative embodiment of the invention provides a plurality of separate stored credits associated with ones of the various service providers. Accordingly, trust among the various service providers need not be relied upon as each such service provider may implement different schemes or other methods of protecting stored credit and/or other data relevant to transactions associated with the particular service provider.

A preferred embodiment of the present invention is adapted to conduct and account for the aforementioned credit transactions through printing an indication of an obligation to pay for the services desired and storing information regarding this obligation within the portable memory and/or a host system coupled thereto. Accordingly, the portable memory may actually hold or store no credit balance, at least with respect to shipping service providers allowing such credit transactions or for which a user has tendered a suitable deposit to the service provider from which such "credit" transactions may later be deducted. However the system will still preferably operate to create the aforementioned indicia which can then be authenticated by the authenticating agency at pick-up, during shipment, or after it has been delivered along with a document or other associated item. Accordingly, proof of the details of the transaction, preferably included in the indicia, may be confidently authenticated or provided such as by a digital signature included in the indicia. Moreover, the shipping service provider may be provided with more complete and accurate information regarding the transaction by simply scanning the indicia.

Preferably, the shipping service provider using such a credit or indication of obligation to pay system implements scanning of each of the printed indicia, as opposed to possibly only scanning a random sampling to detect and deter fraud. Accordingly, a shipping service provider may provide the indicated service only if the indicium is scanned successfully. A billing system may be implemented such that any successfully scanned indicium is considered a service order and the user is charged accordingly.

In an alternative embodiment of the present invention, the system is arranged to automatically calculate the correct postage associated with or to place on a letter, parcel or label as a function of the class, zone, weight, and the like of the particular item to be shipped. One embodiment of the present invention includes a balance coupled to the host processor-based system so that items to be shipped can be placed on the balance and the weight of the item automatically entered into the system for calculating the correct shipping fees for that item. Another embodiment relies on item generation information provided by a coupled process utilized in creating the item, such as a word processor, in order to determine a weight of the item.

Preferably, the invention operates to provide a user with information regarding shipping an item via ones of the available shipping service providers in order that the user may make an informed decision as to which such provider to choose for a particular transaction. For example, the user may make selections, such as a zone, delivery schedule, and shipping weight, and be presented with the fees and other information, such as service limitations, insurance availability, additional services, etc., associated with various ones of the shipping service providers associated with these particular selections. Thereafter, the user may select a particular shipping service provider and/or a particular service offered by the shipping service provider and the invention operates to print an indicia or other proof of payment or obligation for payment, i.e., a valid waybill including user number and transaction number indicating authorization for the shipping service provider to provide the service for the designated fee.

In another preferred embodiment of the present invention, the display screen coupled to the processor-based system employs a "WINDOWS" (general purpose graphical user interface) type display for interfacing with the user. Through the display screen, the program will request a password from the user and the amount of postage or other fees or information the user wishes to apply to a piece of outgoing mail or corresponding label for subsequent application to a package or envelope. The user will enter the desired amount of postage, fees or other information; the program will retrieve this postage stored within the portable processor, and the E-STAMP (indicia creator) (indicia creator) program will print postage indicia or other authorization information through a coupled printing device onto the outgoing mail or label.

In still yet another preferred embodiment of the present invention, the program may be coupled to another process, such as a word processing, accounting, or spreadsheet program, residing within the processor-based system. As a result, the application of the postage indicia or other authorization information may be made in conjunction with the other process, which has capabilities, such as to print envelopes, separately or in conjunction with the printing of a corresponding letter or to otherwise supplement the printing of the postage indicia or other authorization information.

Furthermore, the system may also be programmed to print the address, return address and postage indicia or authorization information on documentation, such a waybills, manifests, bills of lading, correspondence, etc. This printed documentation can then be placed in envelopes with cutouts, glassine paper, or the like at the appropriate areas so that the address, return address and/or meter stamp can be viewed through the envelope.

In another preferred embodiment of the present invention, the aforementioned portable processors are specially manufactured by Dallas Semiconductor for use in conjunction with programs, i.e., unique serial numbers specific to the program are embedded within each portable processor button. These serial numbers are then recorded in a user registration database for use by the Post Office or other shipping service provider and the software to scan and verify letters. Thus, a form of security is provided since only the portable processors specially manufactured for use with the E-STAMP program are able to receive or retrieve data pertaining to postage amounts, as previously described.

Additionally, a special user-defined password may be dedicated for use with the program so that access is only provided to users entering the correct password. The aforementioned serial numbers and passwords may, in addition to protecting against unauthorized use, also allow a user and the service providers to track postage used by every company, department, employee, etc. Furthermore, other software programs may also be configured to access the control program so that spreadsheets and/or graphs may be produced providing statistics on postage use within a business.

Furthermore, the control program can be used to encode a variety of information within the postage indicia or other authorization information using bar code symbol technology. Such information would be machine readable and can be used to identify forgeries, in combination with the established control database of active system users.

When the portable processor memory is refilled, the recorded transaction information can be analyzed either from the perspective of management information or to try to detect fraud. This allows for authentication or verification at a point remote (both physically and electronically) from the user and remote from the PC and even remote from the portable processor. Additionally, at this time a single service provider, such as the United States Postal Service, may account to other service providers for transactions authorized by the portable processor memory, or otherwise provide transaction information thereto.

It is one technical advantage of this invention that the most vital security-related pieces of the system are performed on board the portable processor so that it is not very easily tampered with.

It is another technical advantage of this invention that the portable postage devices are easily transported from one standard computer to another.

It is another technical advantage of this invention that the portable postage storage devices are durable, long lasting and economical. One method of accomplishing this is to use a portable processor with a hardened case, not allowing direct contact with the processor. In this way, the code which defines the personalizing of the processor remains secret and cannot be disassembled.

It is another feature of this invention to provide a system and method that as transactions take place the portable memory records information about each transaction and maintains a log of the most recent transactions. Accordingly, transaction records or logs may be maintained securely for later use such as in detecting fraud or tampering as well as providing an audit trail.

Additionally or alternatively, such transaction information may be stored in an audit log external to the portable memory, such as on the host system or other durable storage device. Preferably the same digital signature created for the debit or credit transaction authorized by the portable memory are stored along with this transaction information in order to validate the transaction information and keep it secure. Accordingly, any missing records or false records may easily be detected through validating the digital signature against its associated transaction information and/or other transaction information.

In one embodiment, it is a technical advantage of the invention that it presents an entire system and method for dispensing postage or other authorization information electronically using a portable processor and refilling of the portable processor through the use of a secure credit server with the transformation of a combination of credits and information about the portable processor user into a graphical security interface, such as a printed postage indicia, entitling the user to obtain an official transaction or service at a point detached from both the processor and the user (such as the sending of a parcel in the mail system).

Another technical advantage is provided in an embodiment of the present invention as transactions may be authorized without the storing of a credit balance, such as on the aforementioned portable memory, which may be lost, stolen, or otherwise fail. Additionally, no money may actually be transacted if the indicia or other proof of obligation to make payment is not scanned, i.e., the accompanying item is lost in shipment etc.

It is a further technical advantage of the invention that a single method and system may be deployed, and subsequently maintained, which provides for the trusted authorization of services by a plurality of service providers. Thus expenses associated with apparatus, training, and maintenance may be reduced. Furthermore, users are provided with information with respect to the offerings of ones of the various service providers for an informed choice of service providers and/or particular services most compatible with their needs and desires with respect to a particular transaction.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 2 illustrates an embodiment of user instructions and screen prompts utilized by the present invention to interface with a user when installing the program on the processor-based system for implementation of the present invention;

FIG. 3A illustrates one embodiment of a user registration form;

FIG. 3B illustrates a postal or verification indicia;

FIG. 3C illustrates an encoded user registration form;

FIGS. 8 and 8A illustrate a display interface provided to a user when accessing the present invention on a host processor-based system;

FIG. 12 illustrates how a postage button is encoded;

FIG. 13 illustrates how an agent or master button is encoded; and

DETAILED DESCRIPTION OF THE INVENTION

Figure 1A:
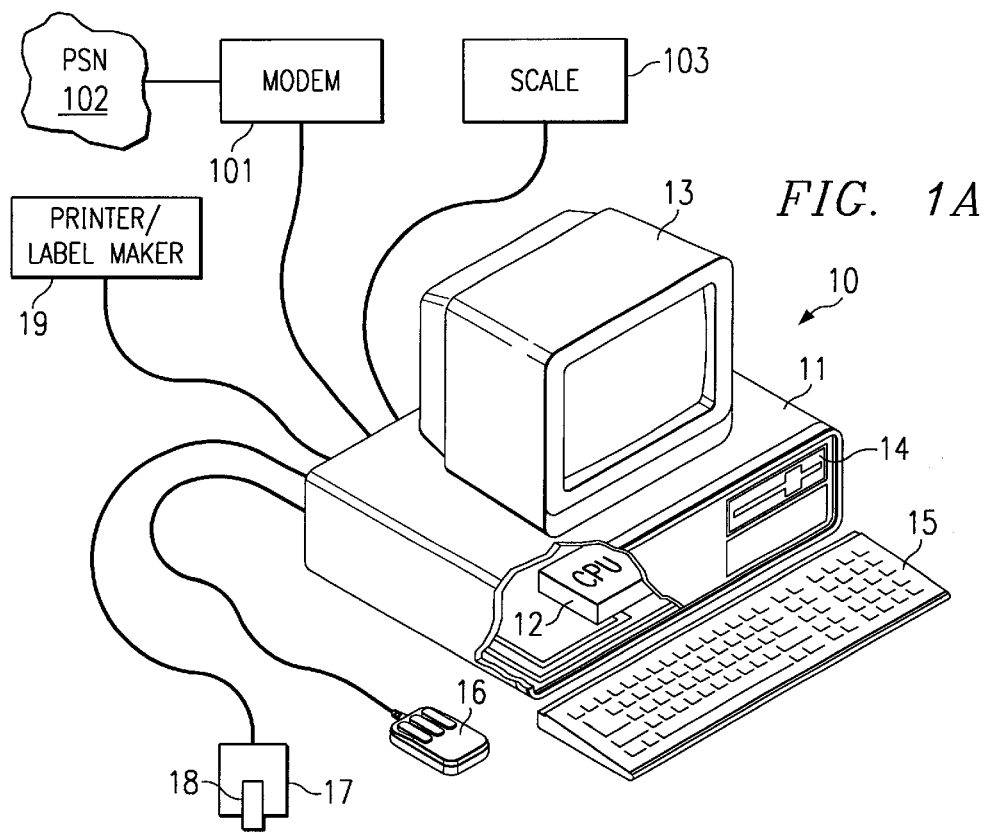
FIG. 1A illustrates a host processor-based system for implementation of the present invention.

The present invention provides for a portable postage dispensing device, described in more detail below, that can be coupled to a host processor-based system at both the customer's site and at the postal authority, or other shipping service provider, such as a parcel delivery service or overnight delivery service, or an authorized agent. Throughout the remainder of this description, reference is made to the U.S. Post Office, postal authority or its agents. Note, however, that the present invention may be implemented within any country and with respect to any postal system or with respect to any data packet which is being examined by a validating authority detached, both physically and electronically, from its source. Likewise, throughout this description, reference is made to shipping service providers. It is intended that national and international shipping service providers such as United States Postal Service, United Parcel Service, Federal Express, Emery, DHL, Purolator Courier as well as regional or local shipping or delivery services such as bonded courier services etcetera be included. Additionally, more traditional trucking services, such as less than a truck load services, are intended to be included in the service providers which may be served by the present invention.

The present invention will allow an individual to purchase a desired amount of postage or other value credit, preferably at an authorized agent of the U.S. Post Office, such postage or credit being stored within a portable postage dispensing device, which itself is a portable processor. The user may then invoke a host processor-based system to access and retrieve a portion of the stored amount of postage or credit via a program stored on the host processor-based system, such program hereinafter referred to as the "E-STAMP" (indicia creator) program. The E-STAMP program requests input on the weight of the item to be shipped, the addressee's address, etc. The E-STAMP program utilizes the information that was entered to calculate the amount of desired postage or shipping fees for an item to be shipped and prints a meter stamp or other authorization information, indicia, on an envelope, label, letter, waybill, manifest, bill of lading, etcetera, through a printer or special purpose label maker coupled to the host processor-based system.

The portable credit dispensing device can also be coupled to a host processor-based system located at the agent authorized by the shipping service provider(s), such as a U.S. Post Office Agent. Particular post office sites and authorized agents will have installed a system complimentary to the software system installed on the customer's PC. The program installed at the U.S. Post Office, hereinafter referred to as the "POSTAGEMAKER" (credit replenisher) will allow an authorized agent to interface the portable postage dispensing device with the host processor-based system residing at the authorized refilling agent in order to replenish the amount of postage or credit programmed within the portable postage dispensing device in an amount requested and purchased by the customer or to otherwise exchange data therewith.

It shall be appreciated that, although described as portable, the storage device of the present invention may be substantially permanently coupled to a host, such as a portion of a mass storage device or a solder connected memory device. The use of such a device according to the present invention may include coupling to a remote credit granting apparatus or credit server as described in further detail below.

Moreover, although referred to herein as storing and dispensing postage, the storage device of the present invention may store credit other than or in addition to credit associated with the posting of mail items though a postal authority such as the United States Postal Service. Accordingly, the term postage credit and postage as used herein includes credit and/or indicia or authorization information associated with service providers other than an postal authority. Likewise, the present invention may operate to disperse authorizations for goods and services without the use of stored credit such as by recording the obligation to pat for such services and creating an indicia representing a service order.

Referring to FIG. 1A, there is illustrated a processor-based system (10) utilized for implementing the present invention, specifically the aforementioned E-STAMP and POSTAGEMAKER programs. System 10 includes chassis 11 enclosing processor ("CPU") 12 and disk drive 14. Coupled to CPU 12 is display 13, keyboard 15 and mouse 16. Furthermore, system 10 is adapted for coupling with a storage device 18, such as the preferred embodiment portable processor button 182 illustrated in FIGLURE 1B and shown in block diagram form in FIG. 11. Storage device 18 is coupled to processor-based system 10 through a postage storage device receptor 17.

The storage device may be any securable, intelligent device having some residual data capability, where that device can provide sufficient security measures to efficiently limit access to the memory and executable code of the device to authorized users. Intelligence is defined as having a CPU or other processor and memory built into the portable processor device.

The preferred embodiment, portable processor button 182, incorporates a small disk having a memory and CPU. Portable processor button 182 is a small, light-weight, portable, essentially non-breakable device available from Dallas Semiconductor, Dallas, Tex. A portable processor button may be coupled to host processor-based system 10 through button holder 172. In a preferred embodiment of the present invention, a batch of buttons will be manufactured with specifically designated serial numbers for use solely with the present invention. However, disposable portable processor buttons 182, preloaded in various denominations, could also be sold either over the counter or in existing stamp machines at post office locations. The postal authority may also select to sell pre-loaded portable processors, on which the customer pays a deposit, that can be exchanged for another portable processor or returned for the deposit whenever button 182 is depleted of postage. All authorized postal agent locations may sell pre-loaded portable processors or the postal authority may elect to designate particular postal authority locations for selling portable processors.

An advantage of the preferred embodiment (the portable processor button 182) is that a portable processor button 182 is small enough and light enough that several may be carried in one hand. Furthermore, the portable processor button 182 is sufficiently durable to be sent through the mail. The fact that the portable processor is universally usable with PC's allows the per unit cost to be lower.

Figure 1B:
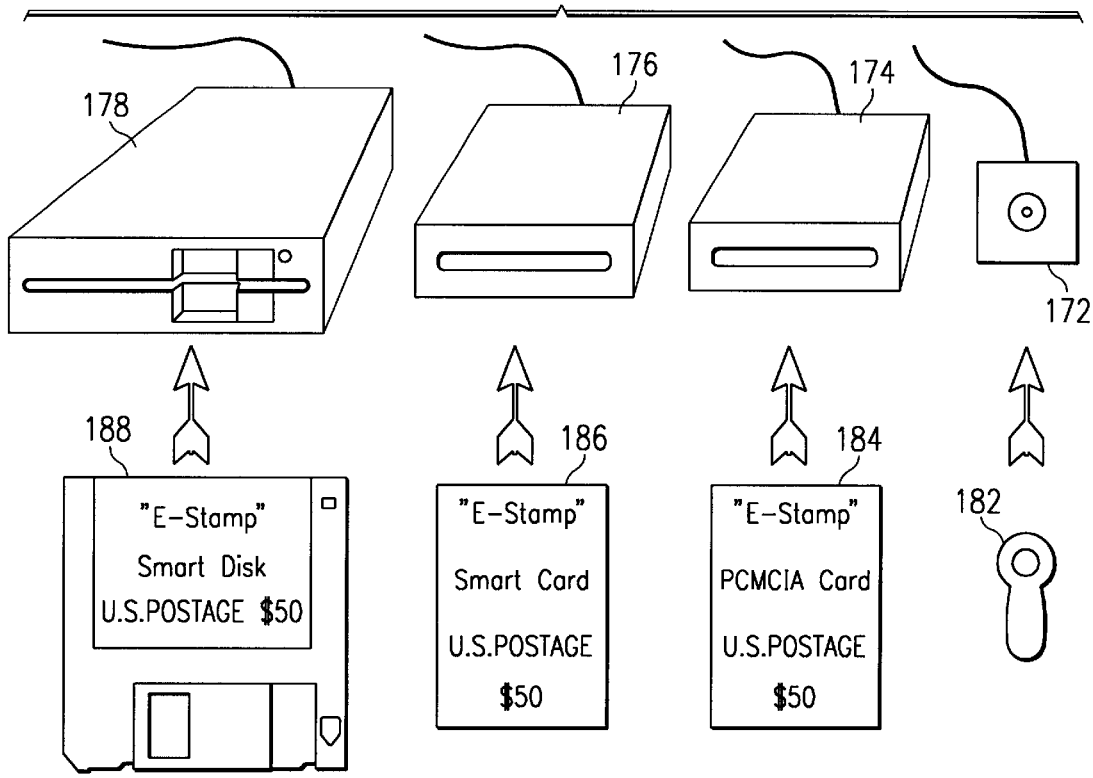
FIG. 1B illustrates several embodiments of the postage storage device.

Additional alternative embodiments of storage device 18 are illustrated in FIG. 1B. One alternative storage device 18 is a smart disk 188 incorporating its own electronic modules capable of read/write operations. One embodiment of such a smart disk 188, SMART DISK, can be obtained from Smart Disk Security Corporation, Naples, Fla. The smart disk looks like a floppy disk and fits into a typical PC's floppy disk drive 178, connected either externally or internally to host processor-based system 10; however, smart disk has its own microprocessor that provides secure, password protected storage. One advantage of the smart disk is that it can operate in a standard PC disk drive without modification to the disk drive or PC. The smart disk provides security for stored postage with an encrypted password and the encryption algorithm.

Another type of storage device 18 is a smart card 186, a plastic card with an embedded microchip. The microchip contains mathematical formulas that encrypt computer data to secure access to that data (i.e., postage) and verify a user's identity before allowing access to the data. One drawback in the currently available smart cards 186 is that they require a smart card processor 176 hooked to the processor-based system 10.

Still another type of storage device 18 is a PCMCIA card 184. PCMCIA cards are currently used on notebook computers for modular storage and communication. Both external and internal add-on readers 174 (i.e., card slots) are available for PCs.

Storage device 18 may be used on a variety of host processor-based systems 10. Host processor-based systems 10 may be located in an individual's home, at any business location, or may even be present in a post office lobby for after hour usage. In a preferred embodiment, system 10 is a PC. In an alternative embodiment, system 10 could be part of a main-frame computer or system 10 could be part of a network system of multiple host processor-based systems or could be coupled, such as through a public switched network, to a remote system, such as the aforementioned authorized credit server.

Typically, a user will buy a storage device 18, containing a small quantity of postage, included with a copy of the E-STAMP program. The user will then install the E-STAMP program on the user's host processor-based system 10.

FIG. 2 illustrates one embodiment of user instructions and screen prompts to be followed by the user during the installation of the E-STAMP program. The instructions and screen prompts illustrated in FIG. 2 reflect the installation of the E-STAMP program in a MICROSOFT WINDOWS general purpose graphical user interface operating environment on a PC equipped with a portable processor TMU button 182 and portable processor TMU holder 172. Of course, other means could be employed for implementing the present invention within a host processor-based system 10.

The user installation instructions 201 inform the user how to pull up the E-STAMP installation program. Once the installation program is initiated, screen 203 will appear. Screen 203 instructs the user to connect the TMU holder 172 to a PC input/output port, such as a serial or parallel port, and to insert the TMU button 182 into the holder 172. The user is then instructed to turn on a printer 19 that has been coupled to the processor-based system 10 and check to see that the printer 19 is supplied with paper. Screen 203 further requests that the user prepare the following information: the user's full name and address, an identification number for the user (i.e., an employer identification number (EIN#), if the user is a business or organization; or a social security number (SS#), if the user is an individual), the usees ZIP code, the useres telephone number and the useres fax number.

The next screen, screen 205, displays the License Agreement with its legal terms and conditions. Acceptance of the terms and conditions set out in the license agreement is indicated when the user continues with the installation program.

Next, screen 207 will appear and display the E-STAMP serial number and TMU serial number. At this time the user-specific information requested in screen 203 should be entered into the E-STAMP program. Once the user has entered the user-specific information, screen 209 will appear warning the user to carefully verify the correctness of the entered information.

After verifying the information added into the E-STAMP program, screen 211 will remind the user to ensure that a coupled printer 19 is on line. The user information entered into the E-STAMP program will then be incorporated into a user registration form, one embodiment of which is illustrated in FIGS. 3A, 3B and 3C. The E-STAMP registration form will be printed in triplicate. The user is instructed to sign and mail two copies of the registration form to the creator of the E-STAMP program, or other authorized agent, and to retain one copy of the registration form. Screen 211 also informs the user that a registration card will be mailed to the user in order that the user may access TMU refilling stations or other authorized credit server.

The E-STAMP installation program continues with screen 213, which describes the progress being made in installing the E-STAMP program, and screen 215, which informs the user when the E-STAMP program installation has been completed.

Referring to FIG. 3A, there is illustrated a preferred embodiment of the E-STAMP registration form. The registration form includes information such as the portable processor button serial number 31, the E-STAMP serial number 32, the date and time that the E-STAMP program was installed 33, and user-specific information 35 (e.g., name, address, telephone and fax numbers, and identification number), and a copy of the License Agreement 38 having an identified location for the user to sign. A preferred embodiment of the E-STAMP registration form will also contain all of the information needed to specifically identify the TMU button, E-STAMP program, and registered user in an encoded format, such as code 301 of FIG. 3C. The encoded information 301 will preferably be in a machine-readable graphical security interface, such as a standard bar code. In the preferred embodiment, the code would be the PDF417 code discussed in more detail below.

As will be discussed, indicia 300 shown in FIG. 3B also has a logo portion 39 and a printed "human readable" portion 38 as well as an encrypted portion 37. It is this portion 37 which is read and, if desired, compared to a database at a location remote from the user, remote from the generating PC and remote from the portable processor.

The standard bar code contains white and dark areas in the form of bars that can be read by a laser scanner. The laser scanner illuminates the white and dark areas with a light of a certain frequency. The light is reflected back to the laser scanner in such a way as to indicate the pattern of white and black areas within the bar code. Since white areas reflect much more light than dark areas do, a perpendicular scan of the bar code will allow the scanner to translate the reflected light into the coded information. More than 20 linear bar code languages have been developed, each with its own specifications for how many bars and spaces make up a character, how characters are to be arranged, whether the characters can be letters as well as numbers, and so forth. The most widely-used bar code is the Universal Product Code (UPC) seen on everyday grocery items. The standard bar code currently used by the post office is POSTNET ZIP+4 described in Postal Service Publication number 67.

More sophisticated graphical security interfaces have been developed over the last decade, such as Intermec Corporations' Code 49 and Laserlight System Inc.'s Code 16K. A major advantage of these more sophisticated graphical security interfaces is that they contain an error-correction formula which can often recover the entire message even if parts of the code have been torn or damaged.

A preferred embodiment of encrypted information 301 is a graphical security interface developed by Symbol Technologies of Bohemia, New York and is called PDF417, a portable data file. PDF417 is a graphical security interface constructed from data units called "words," each of which is 17 modules long. Bars are made from filling in up to six consecutive modules and each unit has four separate bars and four spaces. In essence, PDF4 17 can stack the equivalent of up to 90 one-dimensional bar codes, each just three hundredths of an inch high. Thus, the PDF417 symbology is more complicated to produce and scan than is the typical one-dimensional bar code and allows for a denser coding of information. Because the PDF417 symbology specification includes sophisticated protocols for error-correction, the actual density of information is highly variable, but can be ten times the amount of information found in United States Postal Service POSTNET bar code, per square inch. PDF417 is available from Symbol Technologies, Inc., 116 Wilbur Place, Bohemia, N.Y. 11716 and the operation of the PDF417 is detailed in PDF Primer obtained from them and is hereby incorporated herein by reference.

When the system administrator, receives the signed License Agreement from the user, the encrypted information 301 can be scanned with a laser scanner so that the information contained therein can be automatically transferred to a Registered User's database. The purpose of this database will be more fully discussed below. When the encrypted information 301 has been transferred to the registered user's database, a registration card containing a serial number will be printed and mailed to the registered user. The valid entry of the user registration information in the registered user's database guarantees that user's mail, or other items, to pass verification at the U.S. Post Office or other shipping service provider, for scanning equipment will preferably be connected to the database, or a copy thereof, for real-time verification of mail or shipment of items.

Of course, separate registered user databases may be maintained for the different shipping service providers a particular user or storage device is authorized to utilize according to the present invention. For example, in the information provided by the user at time of initialization or registration may be information with respect to particular service providers from which service is desired. Accordingly, the appropriate registration information may be parsed from the registration information for inclusion in particular databases associated with these selected service providers and, thereafter, provided to the service providers for real time verification of items shipped.

System 10 may be utilized at a customer site for permitting a user to retrieve postage, or other credit, stored within storage device 18, via the E-STAMP program, for subsequent printing as a postage indicia or other authorization information onto a piece of mail through printer 19, coupled to system 10. Likewise, system 10 may be utilized at a customer site for permitting a user to print information indicating an obligation to pay for selected services (credit transaction), rather than actually printing an indicia of payment, while storage device 18 securely retains transaction information therein for later auditing and/or assessment of monies due. Of course, as described above, system 10 may additionally or alternatively store transaction information, such as in disk drive 14, for later auditing and/or assessment of monies due. The utilization of the E-STAMP program by a customer will be further described below.

POSTAGEMAKER FUNCTIONALITY DESCRIPTION

Figure 4A:
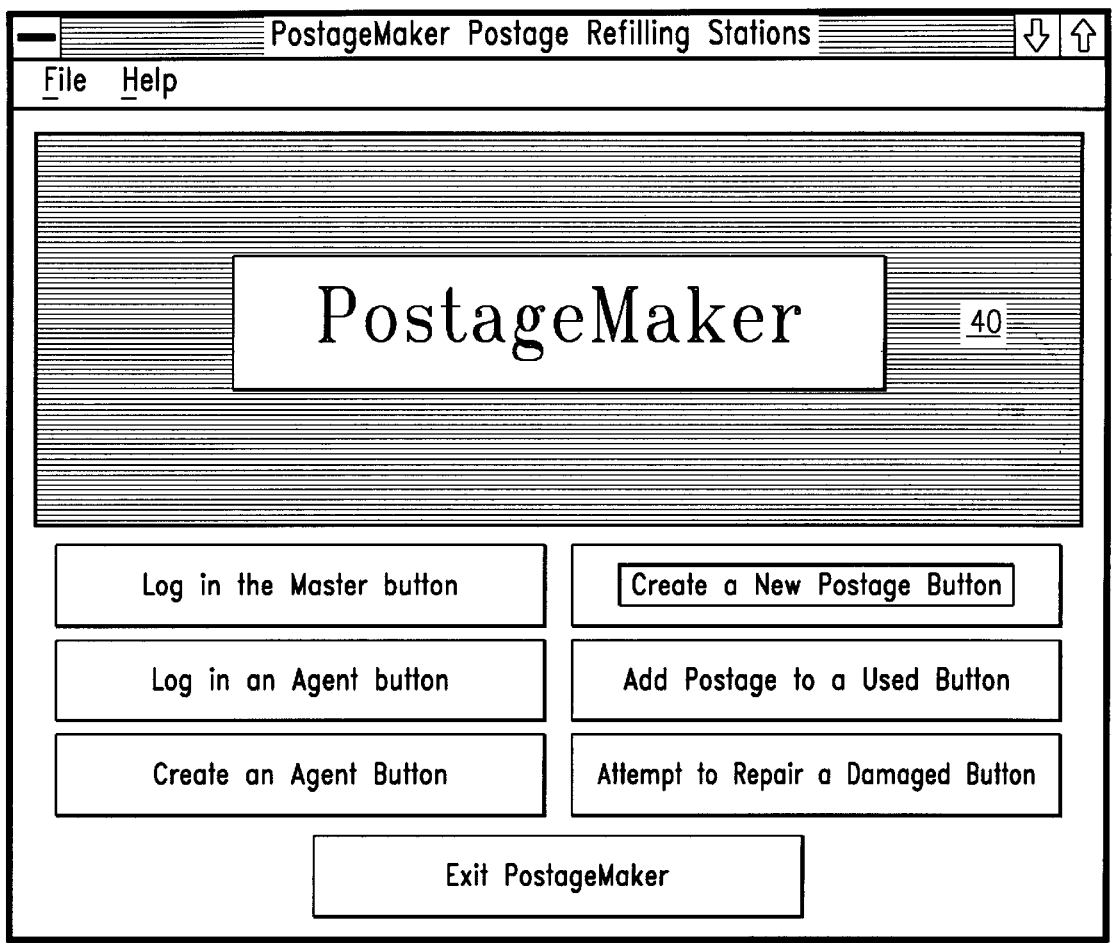
FIGS. 4A–4O illustrate display screens utilized by the present invention to interface with a postal authority employee when replenishing postage within the present invention.

Referring to FIG. 4A, there is illustrated a preferred embodiment of a display screen 40 shown on display 13 (FIG. 1A) to a postal agent when accessing the present invention on system 10 for management functions such as refill of credit. Of course, the particular display aspects illustrated in FIG. 4A may be modified in any one of numerous ways. Also, in a preferred embodiment of the present invention, host processor-based system 10 will provide for input from a user via keyboard 15 and mouse 16. However, other various forms of input may be utilized, such as a light pen or touch-sensitive screen (both not shown).

Alternatively, the value incrementing aspect of the present invention may be adapted so as to be fully or substantially automated and thus operate substantially free of operator input. In such an embodiment, a user's system 10 may be coupled, such as through modem 101 and PSN 102, to the POSTAGEMAKER program executing on a system 10 disposed in a secure environment, or otherwise adapted so as to prevent unauthorized access and/or interception and utilization of communicated information, such as through password protection, secure handshake, and/or encryption. Preferably, communication between such systems 10 to conduct refill and other transactions is accomplished utilizing fault tolerant techniques such as shown and described in the above referenced patent application entitled "SYSTEM AND METHOD FOR PROVIDING FAULT TOLERANT TRANSACTIONS OVER AN UNSECURED COMMUNICATION CHANNEL," previously incorporated herein by reference.

Figure 4B:
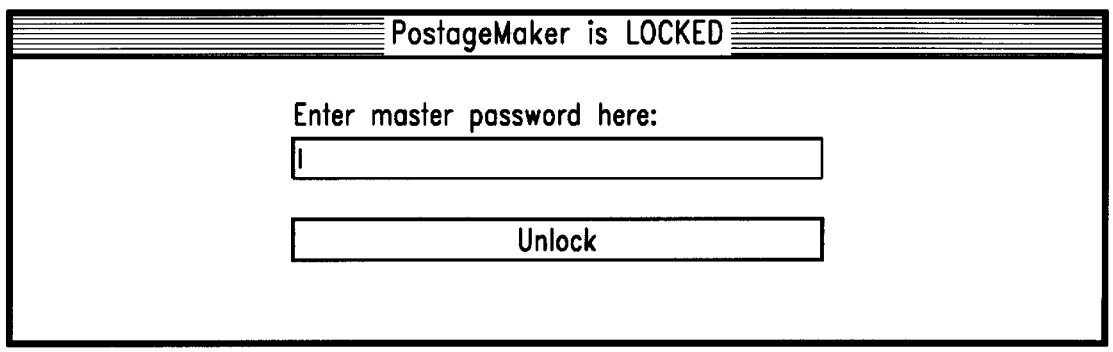

Accordingly, a user, or the E-STAMP program, may determine a point at which it is desired to increment a credit amount, or otherwise update information, stored in the portable memory and establish an information communication link between a system 10 executing the POSTAGEMAKER program and a system 10 executing the E-STAMP program. Thereafter, the desired credit amount may be incremented, information reflecting the obligation to pay for shipping services, i.e., credit transaction data, may be communicated, and transaction information or the like may be exchanged. It shall be appreciated that such an exchange of data may be fully automated, such as to occur as needed, i.e., when a stored credit or a total amount of an obligation to pay for previously rendered services reaches a threshold value, at particular times, i.e., off peak communication network hours, and/or particular intervals, i.e., after a selected number of days, weeks, months, or meter strikes.

Where the POSTAGEMAKER program is adapted for operator supervision and/or control, the main screen preferably consists of function "buttons" which may be clicked on with the mouse 16 to activate them. At the beginning of a session, the postal agent must have a supervisor enable the program by putting a master portable processor button 18 into holder 17 and clicking on the function "Log in the Master Button." The master password is typed into the dialog window illustrated in FIG. 4B. The password here will be passed to the master security button for verification against the one stored inside of it. If the password is incorrect or the button was not the correct one for this supervisor an error will be displayed and the POSTAGEMAKER users will be prompted to retry the master login operation.

It shall be appreciated that communication between host system 10 and the coupled storage devices may be over an unsecured channel and may be subject to tampering, interception, and/or disruption. Accordingly, the preferred embodiment of the information exchange between these devices is as shown and described in the above referenced patent application entitled "SYSTEM AND METHOD FOR PROVIDING FAULT TOLERANT TRANSACTIONS OVER AN UNSECURED COMMUNICATION CHANNEL."

Figure 4C:
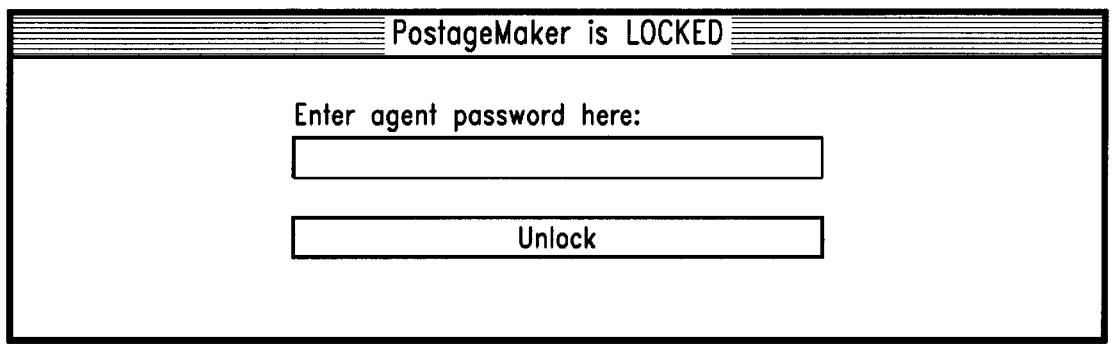

With login successfully accomplished, the postal agent then must log into the POSTAGEMAKER system by plugging his/her agent portable processor button 19 into holder 17 and clicking on the function "Log in the Agent Button." The agent password is typed into the dialog window illustrated in FIG. 4C. The password here will be passed to the agent security button for verification against the one stored inside of it. If the password is incorrect or the button was not the correct one for this agent an error will be displayed and the POSTAGEMAKER users will be prompted to retry the agent login operation.

Once both master and agent security buttons have been logged-in, POSTAGEMAAER is now considered to be a valid credit server. In this discussion, credit server is defined as a host system-based application which is empowered to allow portable postage dispensing devices, such as storage device 18, to become credited with prepaid postage values for subsequent control of a processor based system or otherwise conduct the management functions described herein.

Figure 4D:
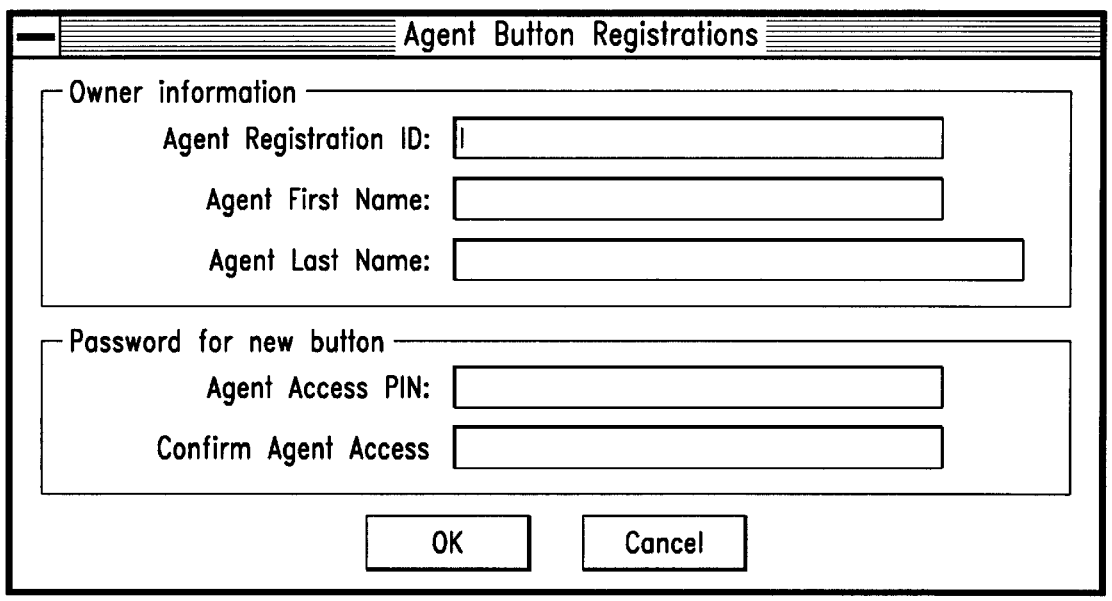
Figure 4E:
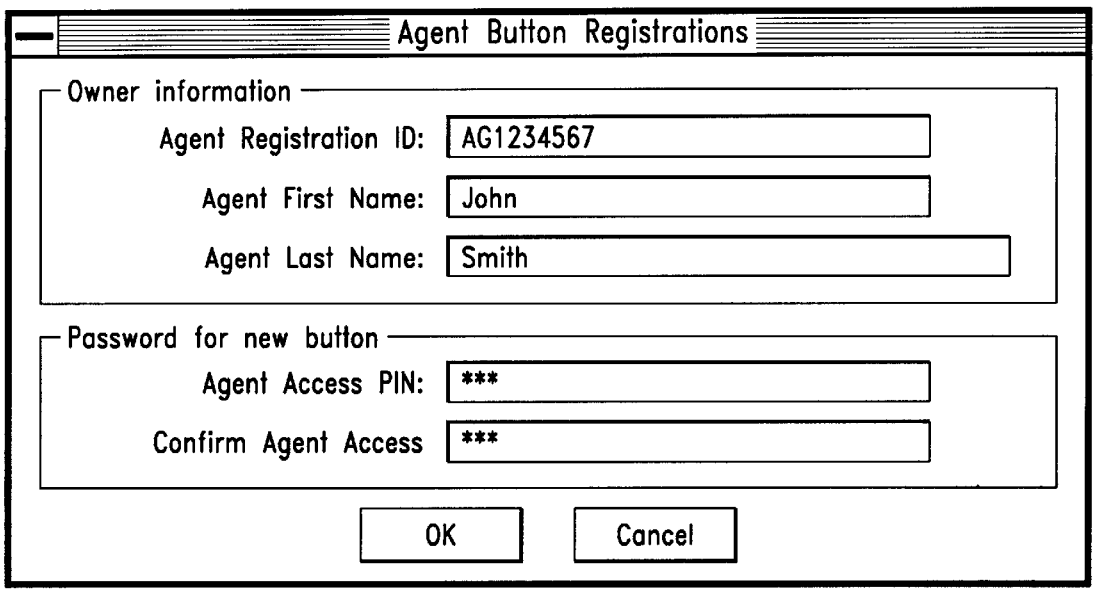

If it should be necessary to create an agent security button, the function "Create an agent Button" should be selected with mouse 16. A valid logged-in agent button is not necessary for authorization to perform this operation. Only a valid logged in master button is required. Once the "Create an Agent Button" function is selected and it has verified proper authority as has been previously asserted, the dialog window in FIG. 4D appears. The Agent Id, Name and access password must be input so they can be registered on the newly formatted agent button. An example of this information appears in FIG. 4E.

Figure 4F:
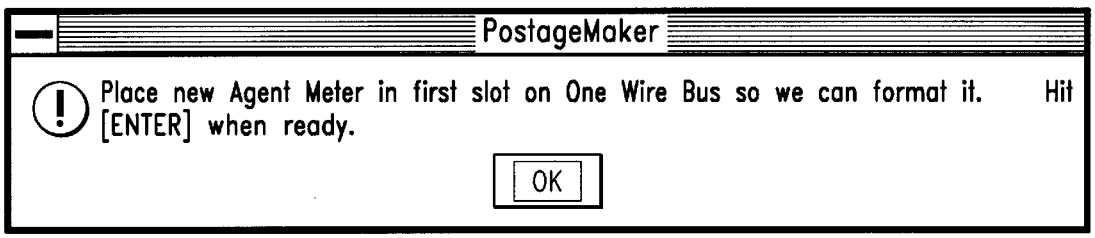

Once this dialog has been fully filled out, the "OK" button should be selected to continue the operation. If "CANCEL" is selected the dialog window appears and the function terminates leaving main control to the main screen pictured in FIG. 4A. If "OK" was selected, the dialog window in FIG. 4F appears, prompting the agent to place a blank button on the interface 17 and hit the ENTER key on keyboard 15 when ready (or use mouse 16 to select the "OK" button on the dialog).

Figure 4G:

The host processor-based system 10, executing the POSTAGEMAKER program will complete the operations necessary to format the button as an agent security device and if successful will display the dialog window pictured in FIG. 4G. Select OK to continue.

To format a new portable postage dispensing device, the agent must select the "Create a New Postage Button" function by clicking on it with mouse 16. At this point, the dialog window in FIG. 4H appears prompting the agent to put a blank postage button on the holder 17. Should the operation fail, a dialog warning of this will appear. If successful, a receipt such as shown in FIG. 4I will print out on the designated agency printer. The receipt is necessary because of the initial value bestowed on the postal button by the credit server POSTAGEMAKER. Along with the receipt, a record is kept in the host processor-based system 10 of the transaction for logging purposes.

To add postage to a portable postage dispensing device, the agent select a the finction, "Add Postage to a Used Button" with mouse 16. Once this is done, the portable postage dispensing device, which was previously placed on the holder 17, will be read and the dialog window in FIG. 4J will appear if the button was newly formatted and has not yet been registered. If the button has been previously registered and is being refilled, a dialog window like that in FIG. 4J will appear but with supplementary information as pictured in FIG. 4K. In both cases, the button serial number is the same, but user registration data has been completed in the latter version in FIG. 4K. User registration information displayed here are: Registration No., Name of registered button owner and ZIP code of registered button owner.

In FIG. 4J, the button has a current balance of $2.00 and expires on Aug. 23, 1995. By filling in an amount in the Transaction Balance field, the agent can refill this button, even though it lacks registration information. It should be noted however, that the E-STAMP program will not allow transactions to be made with this button before it has been registered and a valid registration number has been stored on the portable processor button.

In FIG. 4K, the already-used and registered button has a current balance of $102.09 and its expiration date is Aug. 23, 1995. Expiration date is always set by POSTAGEMAKER as 90 days from the date of refill. This implies that revisits for refill operations must take place at least once every quarter. This is an arbitrary restriction and can be changed if desired. Any one of a number of "time-out" scenarios could be employed. For example, a preestablished time of three months from last refilling, or the time-out could occur a certain time after non-use or a certain number of meter strikes. However, setting a relatively short expiration date window, such as the above mentioned 90 days, may be desirable, for example, where a single credit register is utilized for prepayment of all shipping service providers with distribution of funds only occurring upon receipt of transaction information during the refill process.

Continuing with the refill operation, if the agent is requested to put $100 worth of postal value on the portable postage dispensing device by the user, this amount is entered in the "Transaction Balance" field with keyboard 15 as shown in FIG. 4L. Selecting the "Accept" function at the bottom of the dialog window will give another dialog window for validation purposes, such as that in FIG. 4M. Clicking "OK" makes this dialog window disappear and control returns to dialog window 4L with the "Refill Balance" field filled out with the $100+previous balance of $2 giving total $102. Clicking "Cancel" in Dialog window 4L simply returns to dialog window 4L without updating the refill balance field. Selecting "ReEnter" at the bottom of dialog window 4L allows the "Transaction Balance" field to be redone in the case a mistake was made. The "Cancel" function at the bottom of dialog window 4L simply cancels the finction and returns control to the main window pictured in FIG. 4A.

The actual committing of the credit operation happens when "OK" is selected at the bottom of dialog window 4L. The meter is credited and dialog window 4N appears to tell the agent the operation was successful. At this point, if successful, a receipt such as shown in FIG. 4O will print out on the designated agency printer. The receipt is desired to maintain an audit trail of the new postal value bestowed on the portable device by the credit server POSTAGEMAKER. Along with the receipt, a record is kept in the host processor-based system 10 of the transaction for logging purposes.

Normally, the portable processor is completely secure from tampering but certain conditions might trigger the portable processor to disable itself to protect its internal postal value integrity. Should this ever happen, the function "Attempt to Repair a Damaged Button" can be used by an agent to notify the portable processor that the matter has been investigated and no fraudulent actions appear to have been committed. This allows the button to start to work again accepting commands from a host processor-based system 10 for both crediting and debiting operations.

The preferred embodiment of the credit refill operation of the present invention has been described with reference to a single shipping service provider accepting payment for and bestowing a corresponding amount of postage credit. This preferred embodiment allows for a single trusted shipping service provider, such as the United States Postal Service, which has already established infrastructure deployed to service the populace in general to manage the payment by users for shipping services of a number of shipping service providers. Accordingly, at time of refill, this trusted shipping service provider may analyze transaction information stored on a storage device 18 to determine amounts of the debited postage credit associated with particular shipping service providers for example, the transaction information may include a record incremented in an amount corresponding to a particular one of the shipping service providers conducting a transaction before a printer is enabled to print information authorizing the particular one of the shipping service providers to conduct a transaction. Thereafter, this trusted shipping service provider may forward monies, previously received in payment of a credit refill transaction, to the appropriate shipping service providers in payment of their services.

Additionally or alternatively, the postage indicia or other authorization information printed according to the present invention and included with a shipped item may be utilized by the shipping service provider transporting the item to demand payment from this trusted shipping service provider. Such a system allows for more timely payment of the shipping service provider actually providing the service.

Alternatively, ones of the shipping service providers, or their authorized agents, may operate credit servers. Accordingly, a particular shipping service provider may refill a credit amount, such as a separate register associated with this shipping service provider in the storage device, upon receipt of payment from the user. Such an alternative embodiment allows for such ones of the service providers to receive prepayment of the fees and, thus, eliminate any delay in collecting for services rendered. Of course, such an embodiment requires these shipping service providers to deploy the infrastructure necessary for their direct involvement in the refilling of credit in the storage device. However, with the proliferation of the Internet and other user friendly electronic information exchange mediums, such infrastructure may be little more than a host system, i.e., a "web server," having the appropriate security measures implemented therewith.

Additionally, even where a trusted shipping service provider, or other operator of a credit server authorized to refill credits associated with multiple ones of the shipping service providers, is relied upon to increment the credit stored in the device the above described use of separate credit registers for ones of the shipping service providers may be utilized to increase the shipping service provider's separate register and to forward the prepaid monies to this shipping service provider, Accordingly, in an alternative embodiment, the POSTAGEMAKER screen illustrated in FIG. 4A may be altered to include an additional finction button(s) in order to identify a particular credit register to refill or otherwise increment. For example, the function button labeled "Add Postage to a Used Button" may be associated with a credit register utilized in generating postage indicia accepted for use by the United States Postal Service, and possibly other indicia or authorization information accepted by other shipping service providers, and a second function button may be disposed thereunder. This second function button, possibly labeled "Add Expedited Shipping Credit to a Button," may be associated with an overnight delivery service such as Federal Express, Emery, or Purolator Courier. Of course, rather than an additional function button added to the screen of FIG. 4A, selection of the "Add Postage to a Used Button" function button may invoke a sub-menu which allows the agent to select a particular credit register to increment.

Although discussed with reference to a trusted shipping service provider, it shall be appreciated that the agent authorized to grant credit according to the present invention may not be a shipping service provider at all. For example, other businesses or entities having a preexisting infrastructure compatible with the deployment of the present invention, such as banks, grocery stores, or the like, may collect prepayments and dispense refill credits.

Regardless of the actual time of payment, it shall be appreciated that the shipping service provider is relieved of many of the expenses and risks involved with collecting shipping fees from the many individuals utilizing their services. Accordingly, the trusted shipping service provider may extract a fee, such as a percentage of the shipping fees, in payment for provision of this valuable service to other shipping service providers.

It shall be appreciated that although a preferred embodiment of the POSTAGEMAKER program has been described above with reference to the use of supervisor and agent buttons to enable particular functionality of the POSTAGEMAKER program. It shall be appreciated this is but one embodiment of a system for providing credit to and/or retrieving information from the user's portable memory, or other storage device, of the present invention. Accordingly, one of skill in the art will readily appreciate that the crediting, determination of obligations to pay, auditing functions, and the like of the present invention may be provided by a number of means including a system not relying on the aforementioned buttons.

E-STAMP FUNCTIONALITY DESCRIPTION

Once the required amount of postage has been transferred to the portable processor button 182, the user may then physically carry the button back to the user's business location and couple the portable processor button 182 to a host processor-based system 10 through button holder 172. Upon invocation of the E-STAMP program by the customer, the customers host processor-based system 10 can access the postal amount stored in portable processor button 182 and download portions of the stored postage to the E-STAMP program to be used for printing postage indicia or other authorization information on items to be shipped.

Figure 7:
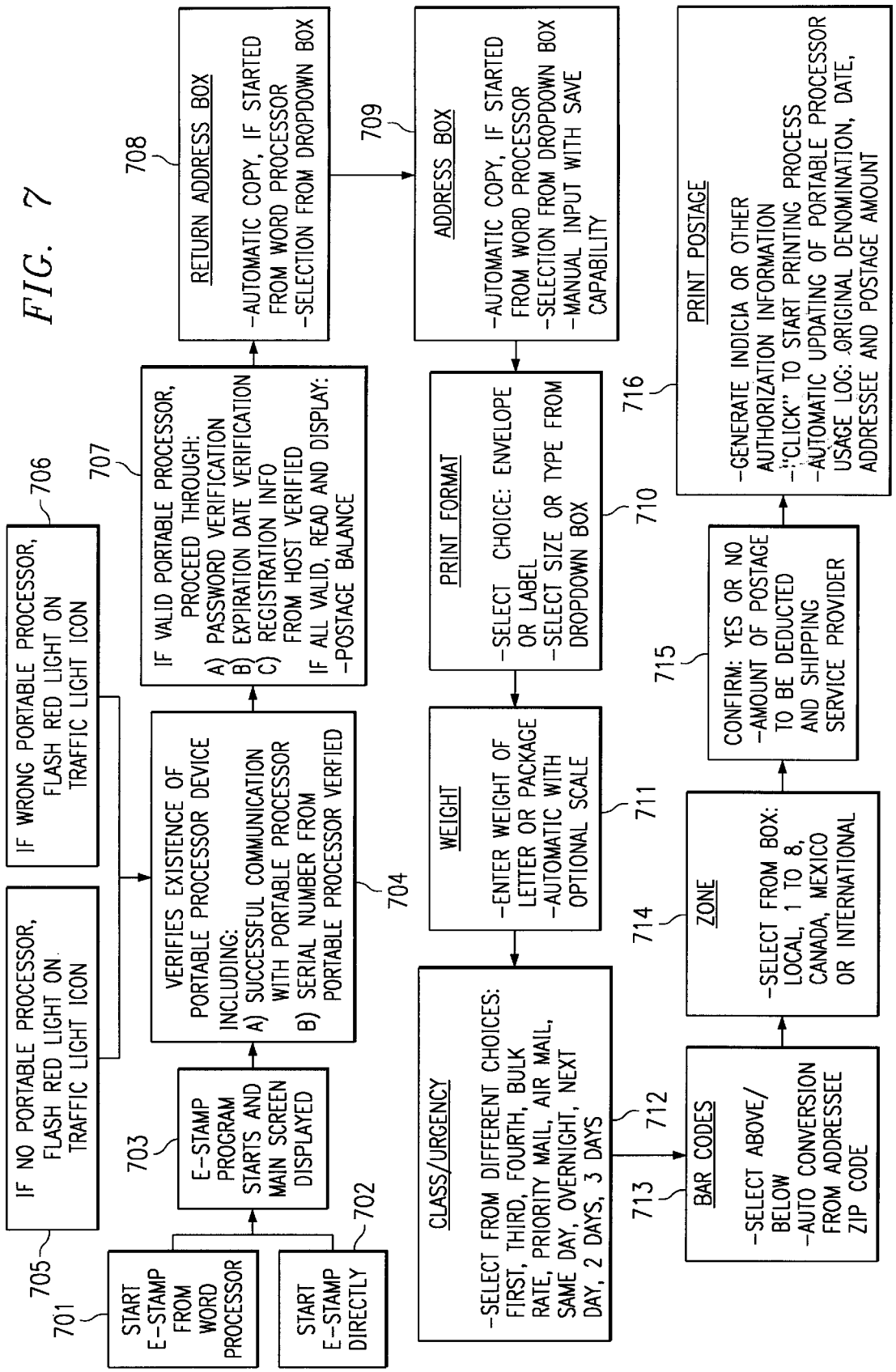
FIG. 7 illustrates a flow diagram of the operation of the present invention within a host processor-based system.

Referring next to FIG. 7, there is illustrated a flow diagram of the process employed within host processor-based system 10 configured for allowing a user to print a postage indicia or other authorization information. As previously discussed, the E-STAMP program may be a stand-alone program, or it may be associated and coupled with another process such as a word processor program. Therefore, the E-STAMP program may be started directly (step 702) or via step 701. Thereafter, at step 703, the E-STAMP program shows display 80, illustrated and described with respect to FIG. 8, to the user.

Next, in step 704, as shown in FIG. 7, the E-STAMP program verifies the existence of portable processor button 182 coupled to host processor-based system 10. If portable processor button 182 has not been inserted within its holder 172, at step 705, a message is flashed to the user to insert portable processor 182. If the wrong portable processor button, or a portable processor button not programmed for use with the E-STAMP program, has been inserted and coupled to system 10, a warning is flashed to the user to insert an authorized, or valid, portable processor button 182 as illustrated in box 706. The process of portable processor verification represented by box 704 includes several steps as follows: Step 1—Successful communication with portable processor within its strict communication protocol and command structure already demonstrates likelihood that at least the type of button is correct (i.e., it is more than just a Dallas Semiconductor button, it is a button running the proprietary code particular to the postage application outlined herein). Step 2—Serial number of portable processor is verified against encrypted registration information in the PC.

If a valid portable processor button is coupled to system 10, at step 707, other information stored in the secure environment of the portable processor is demanded via the common command structure used for host-to-button communications. The process of portable processor connection represented by box 707 includes several steps as follows: Step 1—E-STAMP passes user password entered to portable processor and verification takes place within the secure environment of the portable processor button to guarantee maximum secrecy of the password. Password is never stored in host processor-based system 10. Step 2—If the portable processor reports a result from Step 1 as a password match, E-STAMP will then be able to access the command facilities of the portable processor to ultimately print postage indicia thereby deducting value from the internal data representation of credit within the portable processor. Step 3—Portable processor verifies its own expiration date based on an internal realtime clock. Host processor-based system 10 never has opportunity to interfere in this decision. Step 4—If the result of the expiration date check of Step 3 is that the portable processor is still valid, the user registration information stored in the host processor-based system 10 is passed to the portable processor for validation. Step 5—If the check of Step 4 is valid, the current meter balance is displayed in the center-button part of the E-STAMP program screen block 806, just to the left of the traffic light icon which will also display "green" to indicate that a valid portable processor button is available for use in printing postage indicia. If any of the above checks are invalid, the traffic light displays "red" to indicate that a valid postage dispensing device was not detected.

Next, at step 708, return address box 803 is completed automatically or manually. The address within 803 may be automatically entered from the adjoining word processor or database program, the address may be selected from a drop-down box (not shown), or the address may be manually input, for example. Any entered address may be saved within the E-STAMP program. Additionally, if a return address is not desired, it may be omitted.

Thereafter, in step 709, the contents of address box 805 are entered in a manner similar to the contents of return address 803.

Next, at step 710, the user may select the print format by the use of the "Print Setup" standard dialog box selected in the "File" Menu as pictured in FIG. 8A. As illustrated, the postage indicia may be printed on a label through printer/label maker 19, or a choice may be made to print the postage indicia on an envelope inserted within printer 19, which may be chosen to be a standard size or a nonstandard size as selected by the user. Note that if the postage indicia is to be printed on a label, it may be desired that the return address within 803 and the address within box 805 not be printed.

Figure 9:
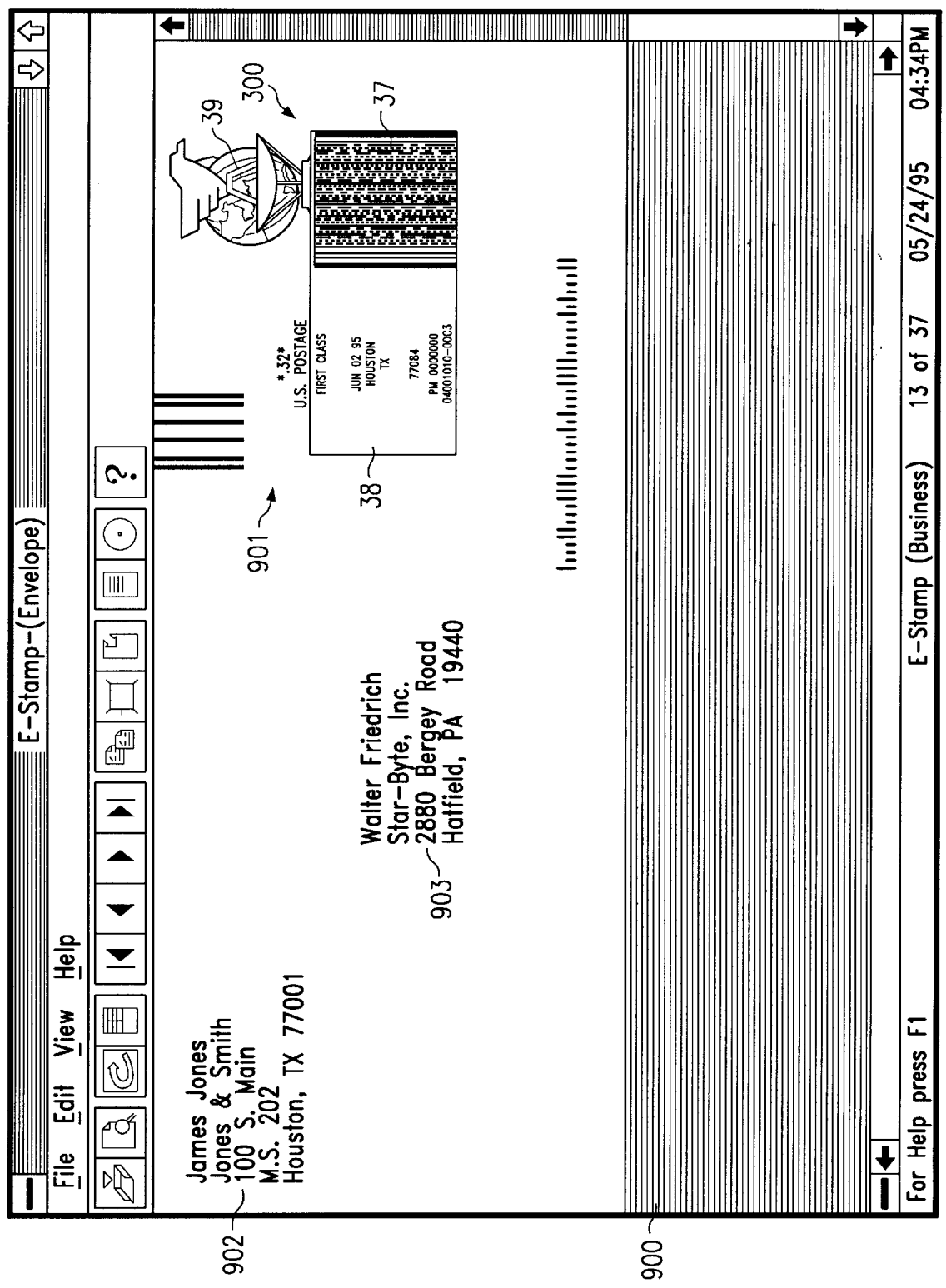
FIG. 9 illustrates an envelope used to display the postage indicia printed on a letter.

Alternatively, the postage indicia and the addresses within boxes 803 and 805 may all be printed on a flyer, a pamphlet, a postcard or a sheet of paper. Whenever the indicia is printed on a letter, along with the addresses in boxes 803 and 805, that letter may be folded so that the indicia will show through an opening or window 901, in the top right hand corner of a specially designed envelope 900 illustrated in FIG. 9 and as shown in co-pending Design Patent Applications Serial No. 29/022,913, filed May 16, 1994, now U.S. Pat. No. D395,333 and Serial No. 29/039,328, filed May 24, 1995, now U.S. Pat. No. D380,007 both incorporated by reference herein.

Envelope 900 may be a standard or non-standard size with any number of windows as designed by the user. Typically, envelope 900 will have a first window 901 in the top right hand corner for the printed postage indicia to show through. Envelope 900 may also have other windows for the addressee's name and address (903) and for a return address (902) to show through. Envelope 900 may have glassine paper, or other transparent covering material, covering the described windows such that the postage indicia and other imprinted information is protected from inadvertent detachment and adverse conditions (such as inelement weather).

Additionally, a user may select a print format such as a waybill, manifest, or bill of lading in the alternative to or in addition to the above print formats. Accordingly, where the item to be shipped or mailed is anticipated to be shipped by a carrier requiring such documentation, the E-STAMP program may automatically generate and/or complete such documentation. Of course, such alternative formats may require additional information from the user, or computer process such as the aforementioned word processing program. Accordingly, selection of ones of the available formats may provide for the acceptance of additional information into the E-STAMP program, such as by opening an additional dialogue box or communicating with the additional computer process.

It shall be appreciated that selection of print format information may be omitted, skipped, or overridden by other selections by the user and/or E-STAMP program. For example, selection of a particular shipping service provider as described herein below may override a portion of the print format selections where the selected shipping service provider requires a particular non-selected format or requires a particular document or form to be completed. Accordingly, in an alternative preferred embodiment of the invention, selection of a print format may be at a point in the process sometime after selection of a particular shipping service provider in order to automatically provide default printing format selections according to the shipping service provider selected. Provision may be made for the user overriding these default selections, if desired.

In step 711, the user enters the weight of the package or letter associated with the postage indicia or other authorization information. This weight may be entered manually, or automatically, such as through the use of scale 103 coupled to host processor-based system 10 in a manner well known in the art.

In step 712, the user selects the class and/or urgency of the item from the choices shown in box 802 and 807. It shall be appreciated that ones of the selections of class and urgency may substantially overlap and, therefore, selection of such an option from one of boxes 802 or 807 may also make a corresponding selection in the other one of boxes 802 or 807.

Figure 8:
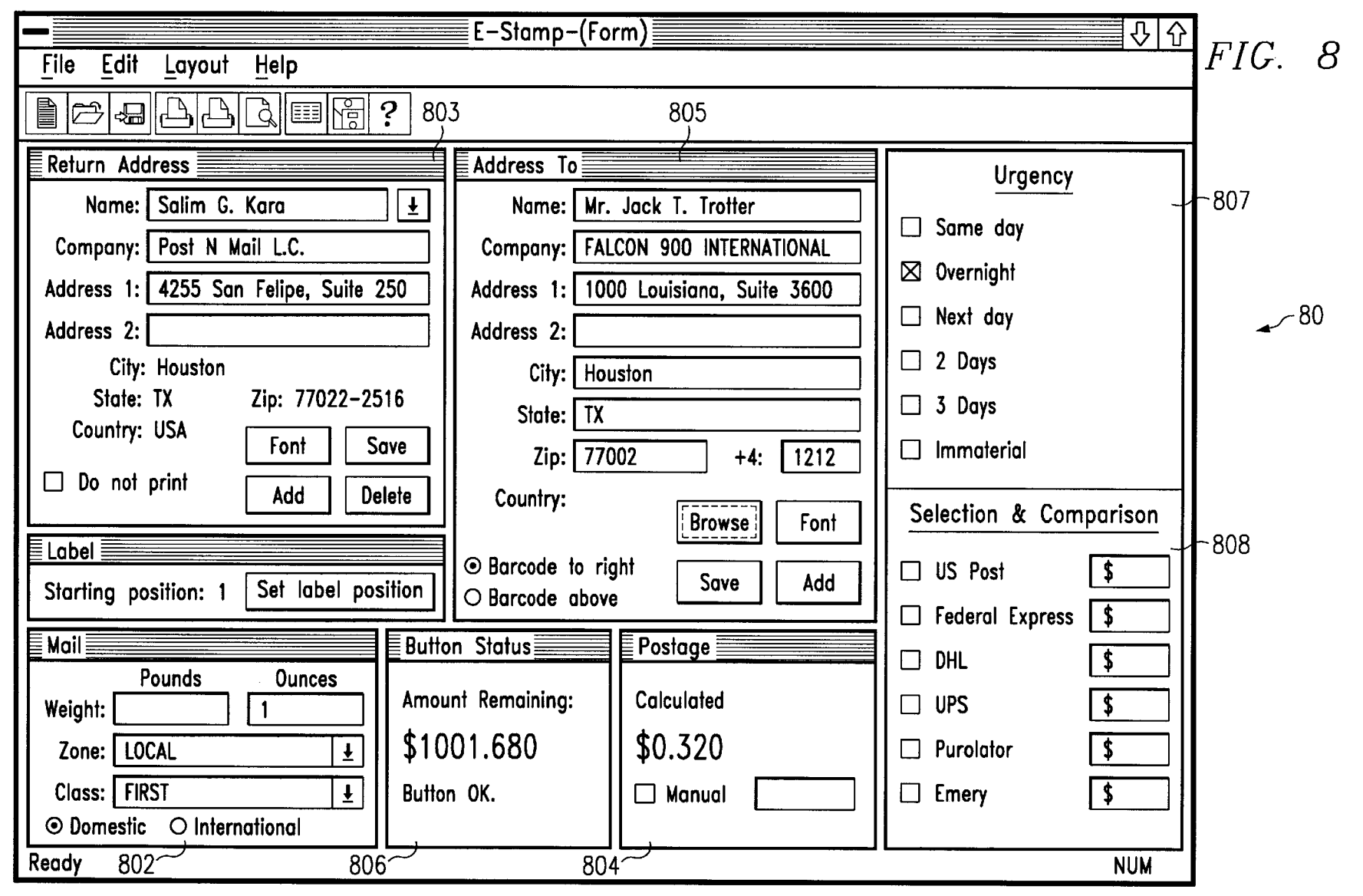

Additionally, class and urgency information may be different for each of the shipping service providers and, accordingly, selection of a particular classes or urgency criteria may be based at least in part on the particular shipping service provider(s) for which the user wishes the E-STAMP program to calculate the necessary postage. For example, different class and/or urgency information may be selected for each shipping service provider for which shipping fee calculations are to be made. Alternatively, the class and urgency information may be presented for selection generically, as shown in FIG. 8, and the E-STAMP program operate to determine the corresponding fees for each of the particular shipping service providers automatically.

Thereafter, in step 713, the user may select the location of routing information for the recipient address. Such information will be automatically extracted from the address, and may be formatted in a special symbology preferred by a particular shipping service provider, such as being formatted in the POSTNET symbology for ZIP+4 information, as provided in Postal Service Publication 67 and incorporated herein by reference.

Typically the postal indicia or other authorization information may include any combination of the following information: the date, the postage dispensing device serial number, the sender's ZIP code, the addressee's ZIP code, the expiration date of the postage dispensing device, the cumulative values of the strike and dollar counters, the E-STAMP registration number or other information identifying the particular user/system generating the indicia, and the post office or other credit server identification number. The postage indicia or other authorization information preferably contains this information, digitally signed by the portable postage dispensing device and presented to the outside world thusly, thereby providing means by which the indicia may be read and automatically by the shipping service provider's, and their authorized agent's, scanning equipment which will be charged with decoding the indicia bar code and verification of the integrity of the indicia. The postage indicia physical form may encode the digitally signed information within an insignia or design, or it may appear as a background for the postage amount printed in a visually recognized form.

Furthermore, the use of the POSTAGEMAKER program in conjunction with a database program will allow the authorized postage by post office location (or ZIP code), post office agent, portable postage dispenser serial number, etc. This information can be easily compiled to determine post office sales, market forecasts, etc. Likewise, this information may be utilized by a particular shipping service provider in collecting fees from an operator of a credit server for service provided in shipping the associated item.

At step 714, the user may select a particular zone associated with the mail piece or other item. Such information may be utilized in the determination of the proper amount of postage or other fees associated with the shipping of the item. Additionally, this zone information may be utilized in determining the availability of a particular delivery service, such as overnight, certified, or the like, available from particular ones of the shipping service providers.

It shall be appreciated that such zone information may be different for each of the shipping service providers and, accordingly, selection of a particular zone or zones may be based at least in part on the particular shipping service provider(s) for which the user wishes the E-STAMP program to calculate the necessary postage. For example, different zone information may be selected for each shipping service provider for which shipping fee calculations are to be made. Alternatively, the zone information may be presented for selection generically and the E-STAMP program operate to determine zones for each of the particular shipping service providers automatically.

The E-STAMP program will automatically incorporate the aforementioned entered parameters—weight, class, zone—in order to correctly calculate the correct postage or credit transaction authorization to print in conjunction with the postage indicia and to deduct from the postage amount stored within portable processor button 182 or record in the transaction registers of portable processor button 182.

In order to present the user with information from which to make an informed choice as to a particular shipping service provider by which to ship the piece of mail or other item, the E-STAMP program may calculate the fees associated with a plurality of the available shipping service providers. Accordingly, the user may select shipping service providers of interest (not shown) in order to allow the E-STAMP program to determine the fees for only those shipping service providers. Thereafter, the E-STAMP program may calculate and display fees associated with shipping the item via the selected shipping service providers according to the desired shipping and/or delivery parameters, i.e., class, urgency, etc. Where a selected shipping service provider does not provide a desired shipping and/or delivery parameter, the E-STAMP program may indicate such and provide the fees for a service offered by that particular shipping service provider most near that desired by the user.

However, in the preferred embodiment, the E-STAMP program automatically calculates the fees for each shipping service provider offering service commensurate with the desired shipping and/or delivery parameters. Additionally, the E-STAMP program may indicate other ones of the shipping service providers which do not provide a desired shipping and/or delivery parameter and provide the fees for a service offered by that particular shipping service provider most near that desired by the user, as well as indicate how their service differs from that desired.

Lastly in step 715, the user confirms his/her choice to print the postal indicia or not, thereby with the understanding that that amount of postage will be deducted from the balance in the portable postage dispenser 182. If YES is chosen, the user selects a particular shipping service provider, such as by checking a box associated therewith (shown in box 808), and control passes to step 716 for printing the postage indicia or other authorization information. At step 716, the E-STAMP program utilizes the input/output ports of host processor-based system 10 to send to printer/label maker 19, the correct data pertaining to the indicia to be printed on an envelope, letter, card or label.

The amount of postage printed on the indicia is automatically deducted from the amount stored within portable processor button 182 by the button itself on command from the host processor-based system 10 in step 716. Other internal information is automatically updated, including the usage record for this particular portable processor, which is kept internally, but accessible to the outside host via authorized commands. Such usage records include, but are not limited to, addressee, postage amount, date, and the original denomination.

Note that during the selection of the various parameters within display 80, the E-STAMP program may be implemented to update the postage amount displayed within meter display 806, 804 as the ongoing communications dialog between the portable processor and host processor-based system 10 is essentially a real-time basis.

The date that the mail is stamped is automatically adjusted every day by a real-time clock which exists in the safe confines of the portable processor and therefore cannot be tampered with by external influence. This will help prevent pre-dating or post-dating of mail. The date and if desired, time, shall also be encrypted in the postal indicia for external verification.

The "Print Preview" option selected from the file menu in FIG. 8A is provided to not only get an idea of how the finished envelope (or label) will look but to add personalized items such as a greeting or graphical bitmap which might represent a company logo for instance.

The aforementioned steps may be repeated for a subsequent piece of mail, or the user may decouple the portable process button 182 from the system 10.

Using the E-STAMP system and method, users like lawyers, accountants, advertising agencies, etc., who bill their clients for postage will be able to keep track of postage expenses on a per-client basis.

POSTAGE REFILLING CONTROL

In the preferred embodiment, storage device 18 includes secure non-volatile (battery-backed) memory and a CPU (central processing unit) capable of executing instructions. These items are enclosed in the confines of a hermetically sealed metal can. While the internal operating code which gives the portable processor its useful attributes is preferably kept in ROM (read-only memory), the extremely sensitive data representations of monetary value, strike counters, usage logs, refilling logs and encryption keys used to encrypt the information passed to the host processor-based system 10 which executes E-STAMP and is then conveyed to a postage indicia or authorization information for use in mailing a parcel.

As discussed in further detail below, there are three different types or applications for the storage device 18 which relate to different levels of authority and use: master buttons (Authority Level 2) which are provided to a limited number of supervising postal authority personnel; agent buttons (Authority Level 1) which are provided to authorized postal agents who perform refill operations on used portable postage dispensing buttons and initialization operations on new portable postage dispensing buttons; and postage buttons (Authority Level 3) which allow the postal customer (user) to print an authorized amount of postage indicia using a separate host processor-based system controlled by the user. In actuality, the first two types of buttons are known as security devices which grant authority to serve credit and maintenance to the third type of button which is a postage dispensing device usable by postal clients.

In a preferred embodiment, at the postal authority (or authorized refill center), both a valid master and a valid agent button must be coupled to the Postal Authority/Refill Station (POSTAGEMAKER) version of system 10 before a refill or initialization operation of a postage button can take place. Of course, where security with respect to providing refill credit is not an issue, or where other means or methods for providing such security is provided, the use of the aforementioned master and agent buttons may be omitted, if desired.

The master, agent and postage buttons are all validated by the Postal Authority/Refill Station software during refill operations. Each postage button (Level 3) is validated by the customer's E-STAMP software prior to the commencement of any indicia printing operations. The sequences for validating the master, agent and postage buttons using the Postal Authority/Refill Station software are depicted in FIGS. 10A–10F.

The Postal Authority validation procedure for a button coupled to system 10 begins at step 1000 (FIG. 10A), with the initiation of the POSTAGEMAKER refill station software. For discussion purposes, assume only one storage device 18 has been coupled to system 10 at this point. At step 1001, the software reads the communication bus to see if any valid devices exist on it. If no, it just continues to look in a "loop." If yes, the POSTAGEMAKER software running in system 10 sends a command to storage device 18, as in step 1002, to demand status information for the button. The button, which is reset from a "sleep" or dormant state when it receives the command, can verify its contents to be correct and that it is the type of button (POSTAGE or SECURITY DEVICE) that the host system 10 expects to work with. If a valid response does not come back before a time-out in step 1003, it is assumed that the button on the communication bus is not valid and an error message would be displayed (Step 1004). If the response is OK, it is implied that there is a good chance this is a properly programmed button because of its validated response to the POSTAGEMAKER specific command issued to it.

At this point, depending on the type of button expected, the status information is checked to see if the button is of that type in steps 1005, 1006 and 1007. Status is checked to see if the button is master at step 1005, if not status is checked to see if the button is agent at step 1006, if not the satus is checked to see if the button is postage at step 1007, and if not an error is generated at step 1004. Based on the decision of what type it is, a connect operation for that type of button is attempted in step 1008, 1014 or 1019 FIG. 10B. If master or agent security device, a security device type of connect is issued to the button (steps 1015 and 1009) and a correct response must be received by the host system 10 before proceeding generating an error at step 1013 if no valid connection signal. If a correct response is received by the host system 10 at step 1015 or 1009, in steps 1010 or 1016 a master or agent password is demanded of the user depending on which type of button is being serviced. Step 1011 validates this password by passing the password to the button so that it can verify it in its own secure environment generating an error at step 1017 if button does not validate the password. The password is never stored in host system 10 for security reasons. A positive validation of password from the button grants (Step 1012) the host authority level of 1 for master and agent simultaneously on the bus and authority level 2 for master only on the bus.

Assuming that the button was a postage type and the connection which was made in step 1019 is made and verified in step 1020 generating an error at step 1013 if no valid connection signal, the POSTAGEMAKER software does not require the validated password of the postage button to continue. However, it will check that the proper authority level two has been previously granted by the presence of both a validated agent and master button on the bus at the same time in step 1021. If the proper authority level has not been attained, no operations may be performed on the postage button. If that authority exists, control can proceed to step 1022 or step 1018 in the case of a customer demand for new button initialization, old button credit refill or old, damaged button repair operations.

Figure 10A:
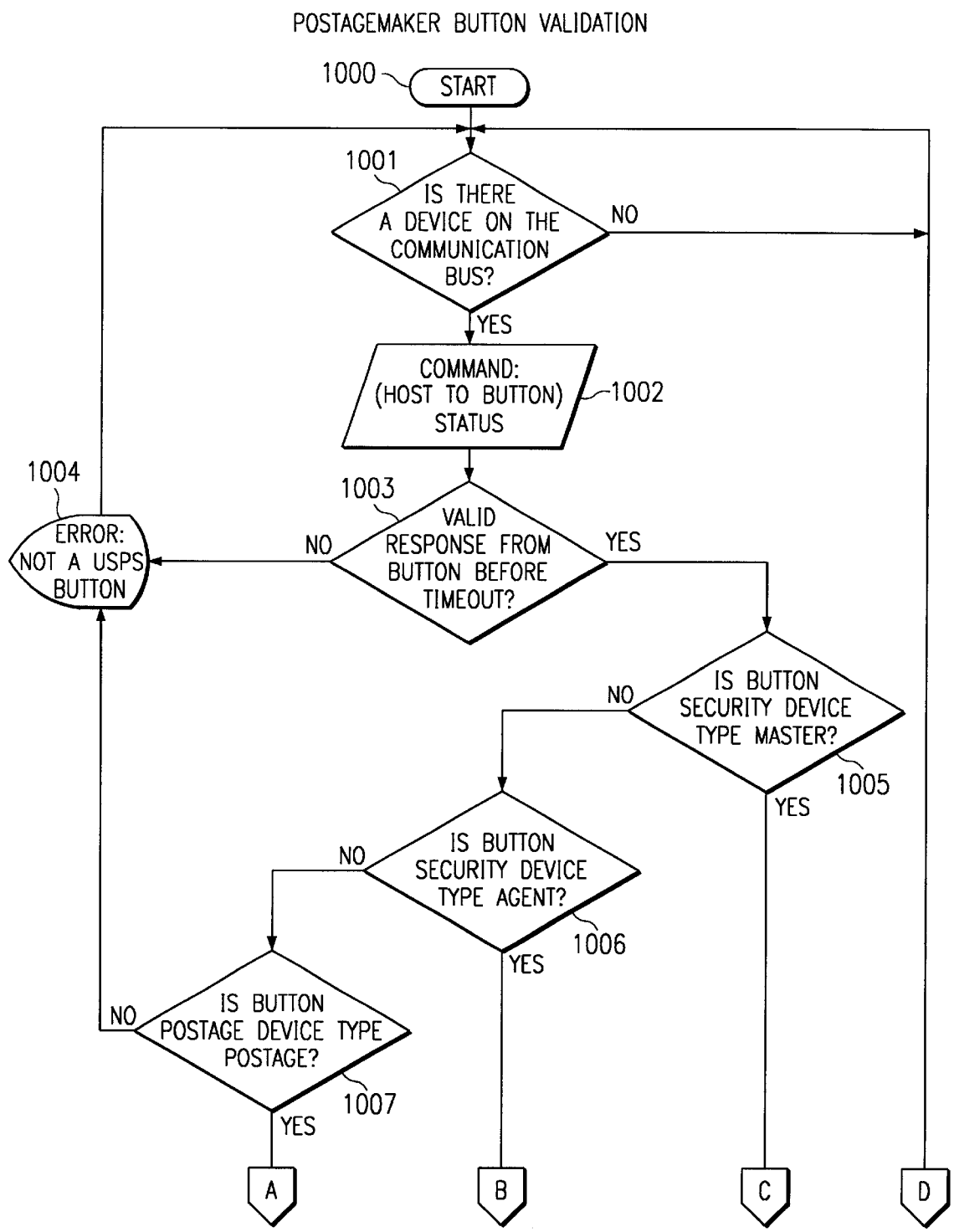
FIGS. 10A–10F illustrate how the master, agent and postage buttons are validated.
Figure 10B:
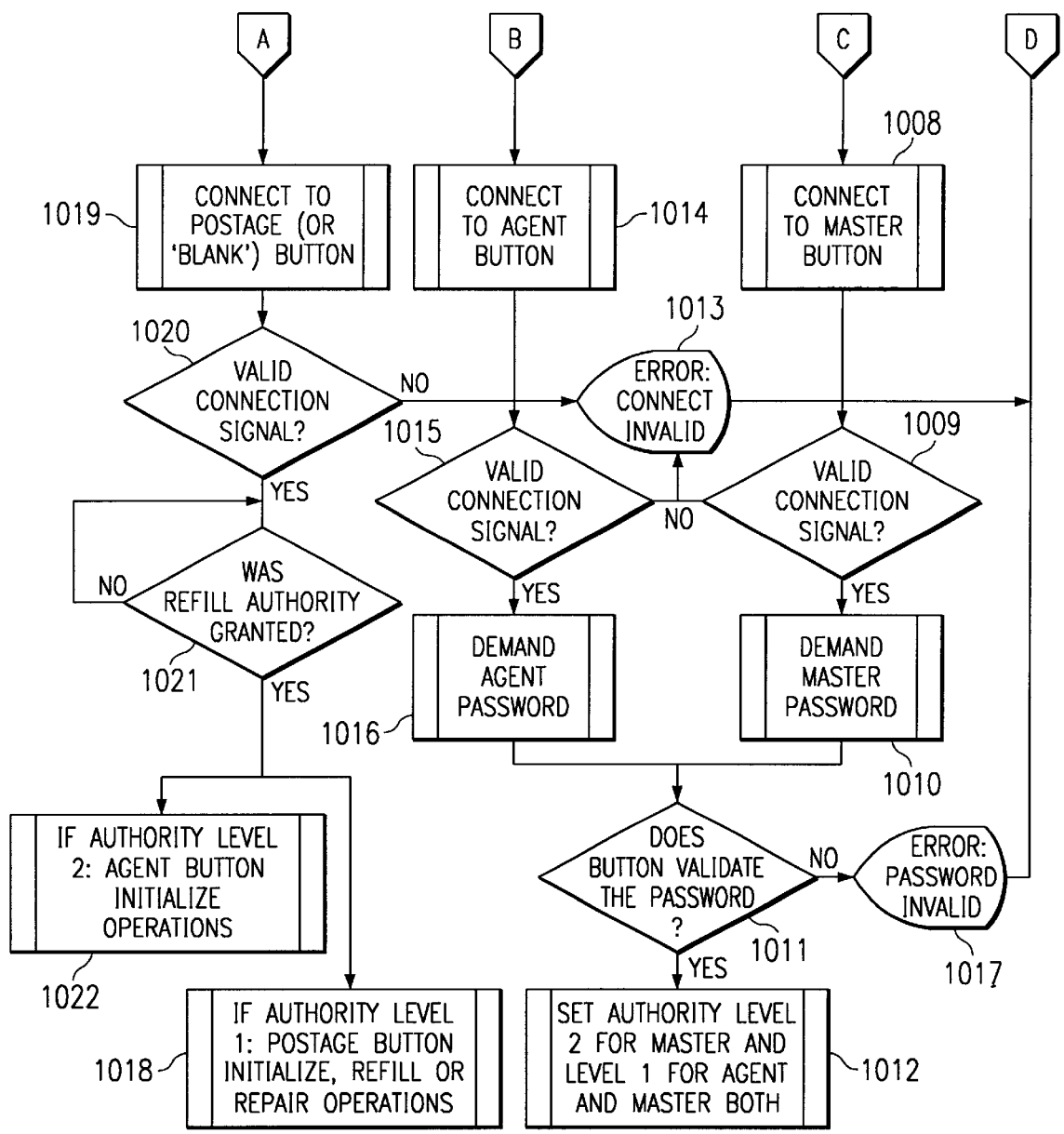
Figure 10C:
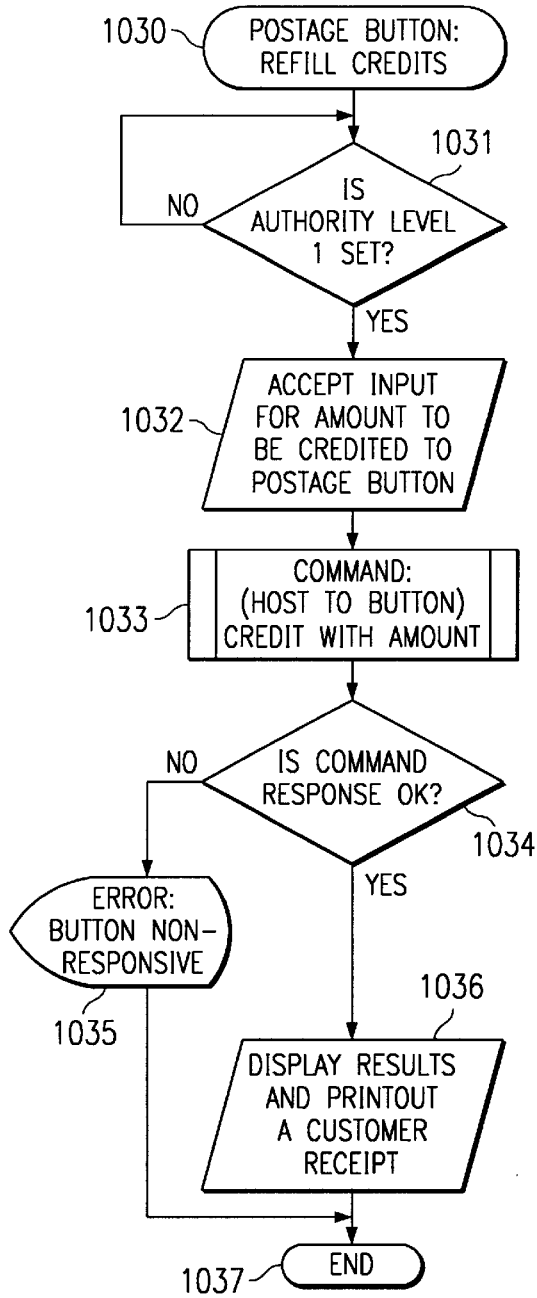

The credit refill operation to a used button is depicted in FIG. 10C, step 1030. The credit command must first verify, in step 1031, its authority level is correct and set at one by the presence of valid and password unlocked master and agent buttons or further postage refill processing is prevented (step 1031). Provided this is the case, in step 1032, the amount of postage to be credited to the button is input by the authorized agent into a form dialog window and validated for correctness by the POSTAGEMAKER software. In step 1033, the credit command, amount and a conglomeration of encrypted data known as a security packet are sent to the postage button which must decode and validate and if all appears to be valid, perform the credit operation before the time-out signified in step 1034 which will occur if the response does not come back from the button to the host system 10 in a specified period of time generating an error at step 1035 if command response not okay. It is the security packet that allows the button to continue with the credit operation. This data structure has a predefined layout and contents which are encrypted using a certain key and method of encryption. This security packet contains data items, such as identification numbers of master and agent issuing the credit to the button, host date/time (which must match not exactly but closely with internal button date/time), workstation number for host system 10 running the POSTAGEMAKER software and postal authority location identification. Other data items could be used for checking purposes. This security packet is different in form and function from the one described here below in FIG. 6.

Figure 5A:
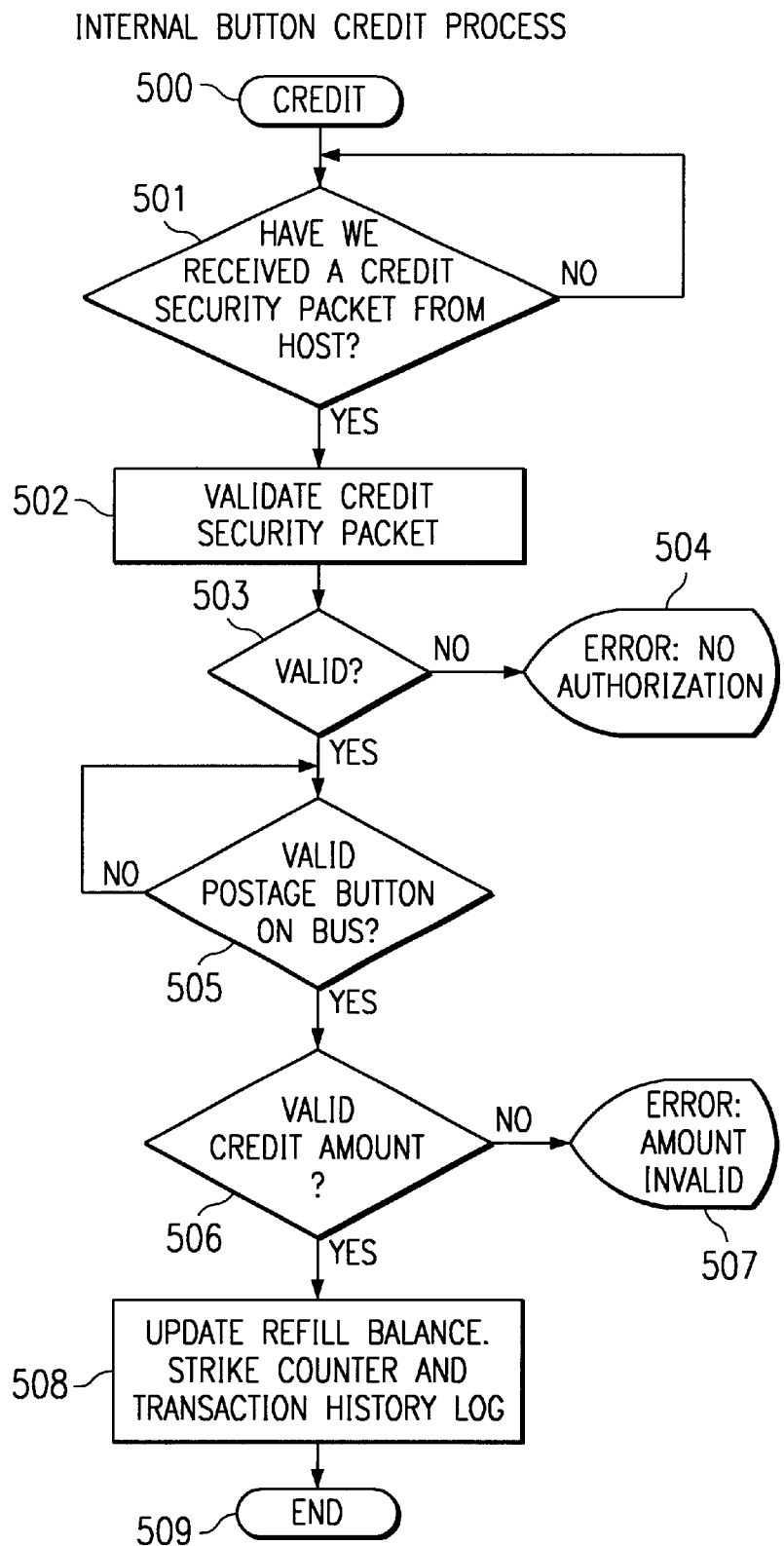
FIGS. 5A and 5B illustrate flow diagrams of the replenishing and debiting processes.

FIG. 5A, which begins with step 500, depicts the credit process. Box 501 reviews the material received from the host to determine validity preventing further internal credit processing if the material received from the host is not valid (step 501), otherwise proceeding to step 502. Boxes 502-504 validate the security packet, generating an error at step 504 if the security packet is not determined to be valid at step 503, otherwise proceeding to step 505. Box 505 validates the proper button is on the bus preventing further internal credit processing if the proper button is not on the bus (step 505), otherwise proceeding to step 506. Boxes 506-507 validate the valid credit amount and box 508 updates the internal memory, generating an error at step 507 if the credit amount is not determined to be valid at step 506, otherwise proceeding to step 508. Box 509 ends the routine.

Figure 5B:
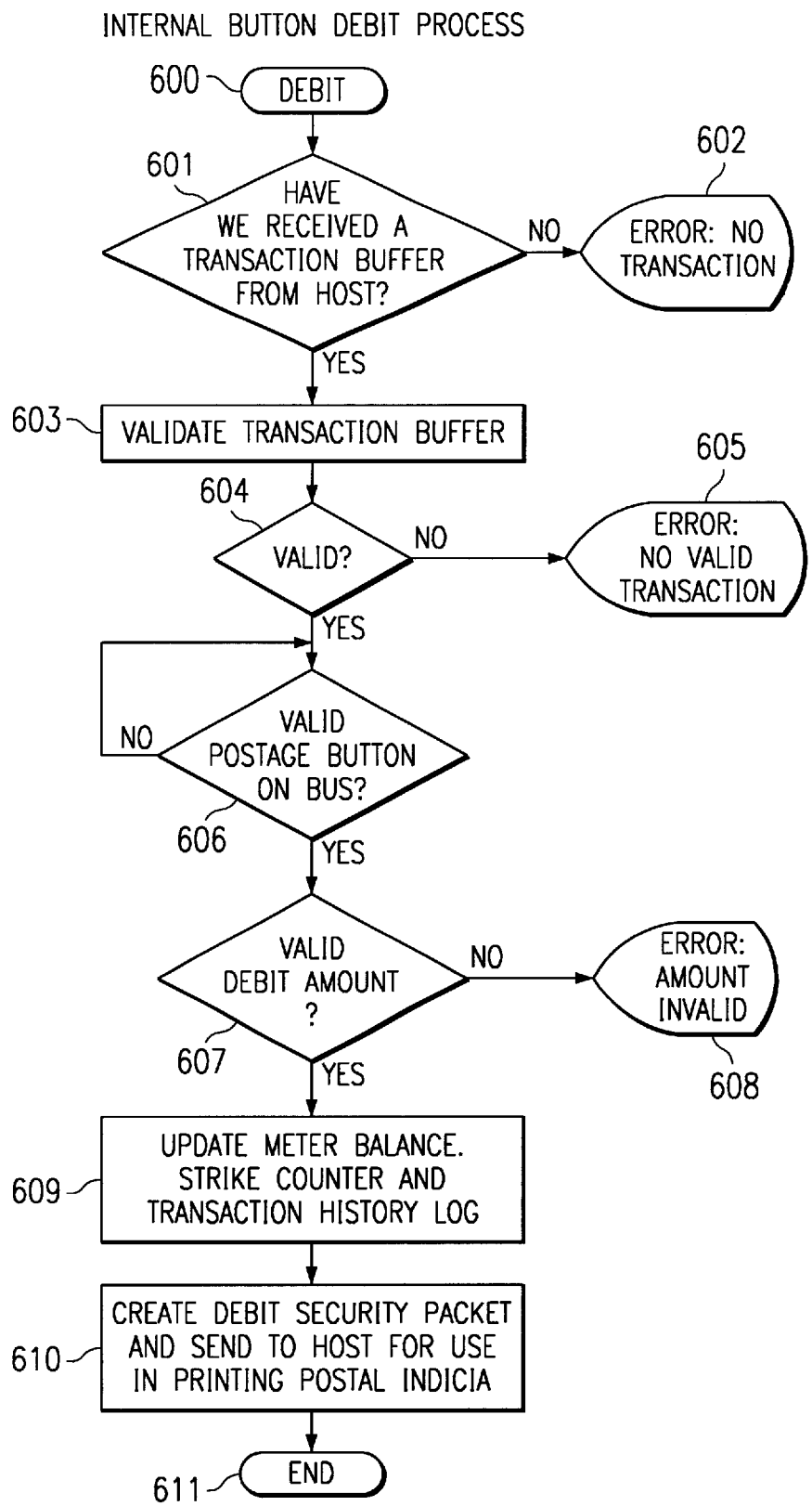

FIG. 5B shows the button debit process which begins with box 600. For boxes 601-605 a transaction buffer request from the host is checked. At step 601 a determination is made as to whether a transaction buffer from the host has been received, generating an error at step 602 if not, otherwise proceeding to validate the transaction buffer at step 603. At step 604 a determination is made as to validity, generating an error at step 605 if not valid, otherwise proceeding to step 606. At step 606 a determination is made as to a valid postage button being on the bus, preventing further internal button debit processing if not (step 606), otherwise proceeding to step 607. In boxes 607-608 the validity of debit amounts on the bus are checked. Box 609 updates the internal registers of the button and box 610 creates the security packet for transmission to the host. Box 611 ends the routine.

Figure 6:
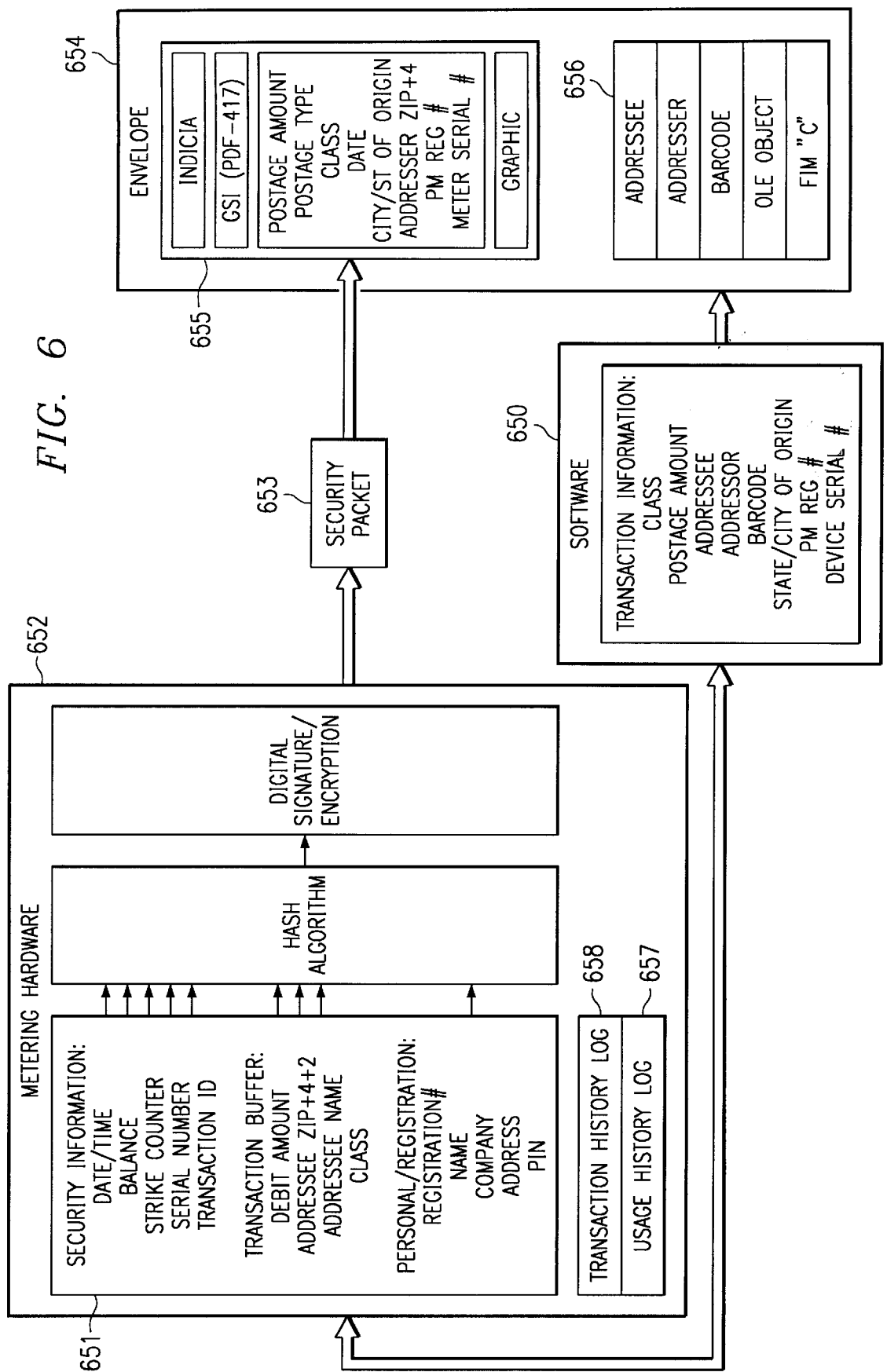
FIG. 6 illustrates a preferred embodiment of the security techniques utilized within the present invention.

Referring to FIG. 6 there is illustrated a preferred embodiment of the transformation of user information by the portable processor button into a data entity known as a security packet which is then handed off to the E-STAMP application, running in a host processor-based system and transformed into an indicia for inclusion on an envelope.

The process begins in Box 650 in the software, running in the host processor-based system, when a user fills out an envelope and demands of the program that it be printed with an indicia of X amount of postage determined by weight, zone, etc., as shown in boxes 654, 655 and 656. Much of the information to be printed on the envelope will be transferred to the internal software printing functions which interact through interfaces with the WINDOWS operating system by methods well known in the art.

In addition and before this hand-off of information is accomplished, in step 651, the program sends a command to the storage device 18 (FIG. 1A) to create a data entity or form known as a security packet. Included with the command is the data that will produce the envelope which may include, but is not limited to, date and time, current balance of metering device, strike counter of total transactions, serial number of meter, transaction id, debit amount, addressee ZIP code, addressee name and class of postage. There is also a complement of information about the user: registration id, name, company and address. Included for secure access to the button is the personal identification number (PIN) which is the password used to unlock the button and is validated within the secure environment of the button.

Once the PIN is validated, the storage device 18 accepts all of this data from the host process-based system and in step 652, using hash algorithms, internal math coprocessor hardware, digital signature/encryption software algorithms, the portable processor produces the security packet, preferably in the form of a digital signature, using information from boxes 657 and 658. The encryption algorithms can advantageously be RSA public/private key but might be changed at any time related to security issues. Indeed, this security packet, produced in the secret and secure environment of the portable processor becomes indecipherable to the outside world including the host processor-based system. The only other entity which should have knowledge of the keys to be able to decrypt this packet or similarly generate a corresponding data packet for comparison therewith would be the postal authority or other shipping service provider in their designated package sorting and scanning centers.

In step 653, the security packet is transmitted back as a response to the host processor-based system. This indecipherable security packet is then handled blindly by the program to the point where it is passed on to a software function within the program which will encode security packet 653 into a bar code image. The program then takes this bar code image, includes certain other unencrypted information for the visual identification of the postage indicia and/or for use in generating a corresponding indicia or security packet for comparison and passes this through the programmer's interface to the WINDOWS system to the standard printing facilities of that environment in a fashion well known in the art. Also included in this step is the passing of the return and designation addresses and all other parts of the envelope which must be printed and can vary based on user choices before the printing step.

These WINDOWS printer drivers, supplied with the WINDOWS system and apart from the E-Stamp system, can change for any given printer installed, isolating an application program such as E-Stamp from the innate differences of these printers in a fashion known as "device independence" also well known in the art. The driver, in steps 655 and 656, does its work of printing on the envelope, 654, which has already been inserted in the printer.

In step 1036 (FIG. 10C), a receipt is printed out for the customer and the results are written in a transaction log stored on host system 10 or on another system 10 connected to the system 10 running E-STAMP or POSTAGEMAKER through a local area network. Box 1037 ends the routine. Box 1037 ends the routine.

Figure 10D:
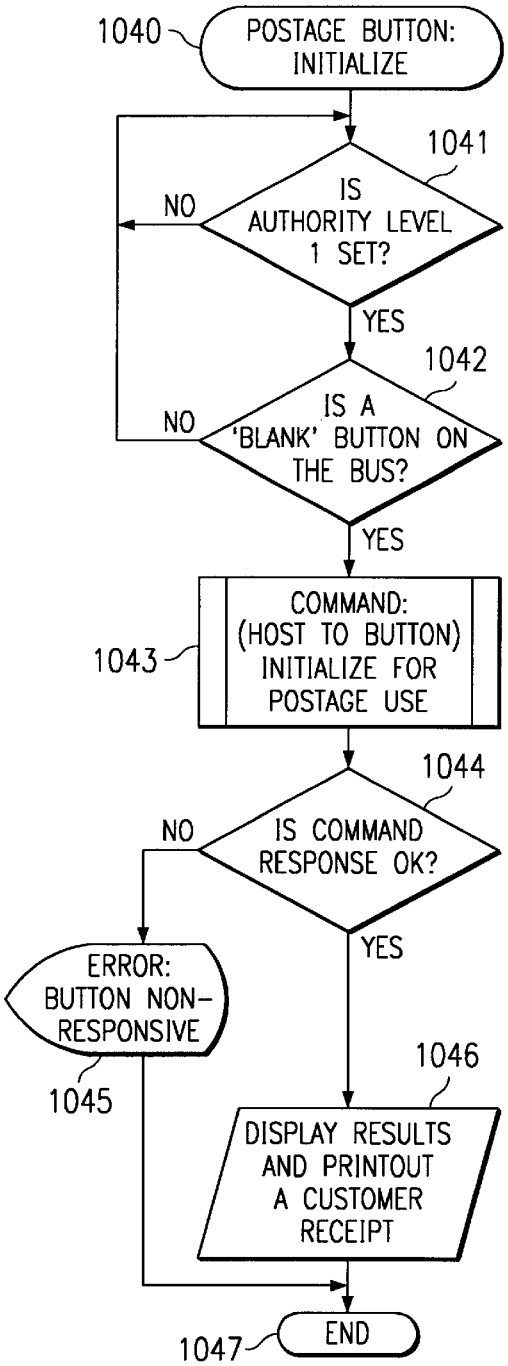

The postage button initialization operation for new (never used buttons) is shown in FIG. 10D beginning at step 1040. The initialization command must first verify, in step 1041, its authority level is correct and set at two by the presence of valid and password-unlocked master and agent buttons, otherwise further button initialization processing is prevented (step 1014). Provided this is the case, in step 1042, the initialization function must locate a "blank" button on the bus to proceed to step 1043, otherwise further button initialization processing is prevented (step 1041). A blank button is defined as one which has pre-loaded operating instructions in its internal read-only-memory which are specific to the application outlined in this patent. The operating instructions must also be of the type of button being initialized. That is, those instructions for a postage button are somewhat different than those for a security device button necessitated by the differences in their operating behaviors and functions.

When a button, postage or security device type, receives an initialization command from the host system 10, it must first have instructions in it to tell it what initialization means and what should be performed to accomplish this. Thus, it is the button that initializes itself after receiving a command from a host system 10, not the host system 10 directly writing in memory locations within the button. The architecture of the button is such that outside influence can not directly change its operating instructions or memory. The host system for the button can only issue commands as defined in a narrow set of criteria to the button to make it perform a task such as initialization, credit or debit operations and repair of damaged memory.

In step 1043, the actual initialize command is issued from host system 10 to button and response of completed or not must return before the time-out period as shown in step 1044, generating an error at step 1045 if command response not okay, otherwise proceeding to step 1046. Box 1047 ends the routine.

In step 1046, the positive or negative outcome are displayed on host system 10 display screen to the agent. The transaction is logged and a customer receipt is printed out by POSTAGEMAKER before ending the initialization function.

The internal layout of data in RAM for a postage button is depicted in FIG. 12, as box 1201.

Figure 10E:
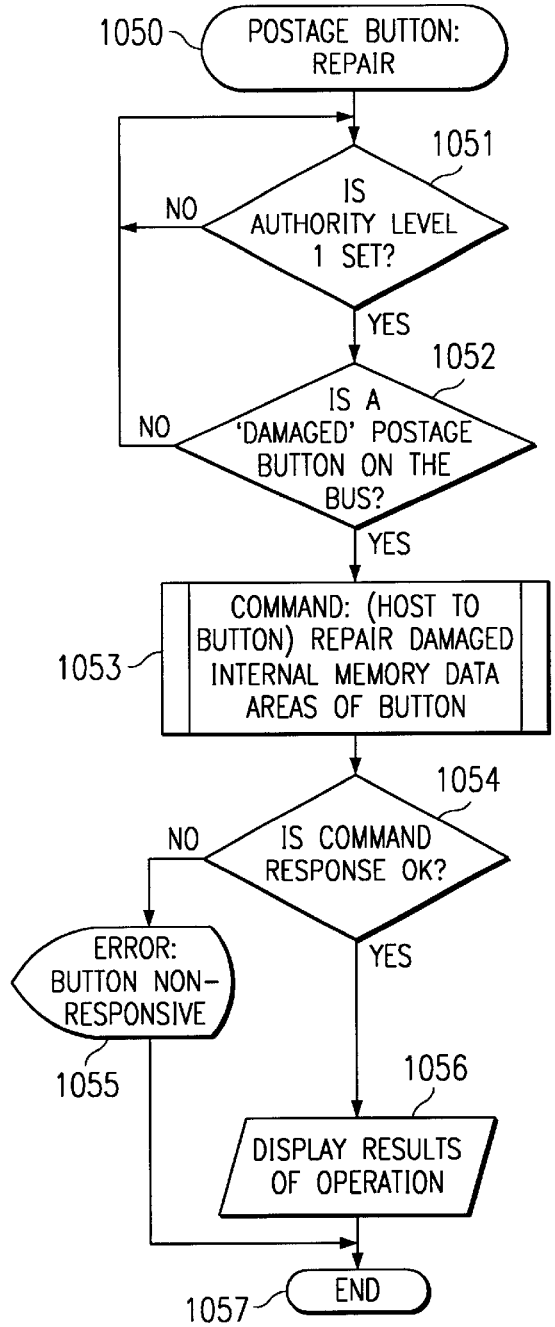

The postage button repair operation is shown in FIG. 10E beginning at step 1050. The repair command must first verify, in step 1051, its authority level is correct and set at one by the presence of valid and password-unlocked master and agent buttons, otherwise further button repair processing is prevented (step 1051). Provided this is the case, in step 1052, the repair function must locate a damaged, but still valid postage button on the bus too proceed to step 1053, otherwise further button repair processing is preventing (step 1051). A damaged button is defined as one which has some internal memory location(s) which have been lost or changed because of internal program errors in the postage button itself Another type of "damage" which may need repair might result if a postage button had ever been lifted from its holder while a host system 10 was issuing commands to it and the button was in the middle of executing some of those commands and the user lifted the button off of its holder. This would then immediately stop execution of the internal operating code of the button, perhaps leaving the results of the intended operation indeterminate.

A more permanent kind of damage might be the loss of internal RAM or ROM which would probably be catastrophic enough that total replacement of the button would be in order. Such replacement would necessarily dictate marking the button serial number as invalid in the user registration database and entering the new button serial number for that user once it has been replaced and registered.

In step 1053, the actual repair command is issued from host system 10 to the postage button and response of completed or not must return before time-out period as shown in step 1054, generating an error at step 1055 if command response not okay, otherwise proceeding to step 1056. The button must act on this command by checking its internal structures insofar as it can to see if all is as it should be. If nothing seems out of order, there is no repair work to be done. Otherwise, anything that can be reinitialized will be, and in any case, the results of the operation are reported back to host system 10 and displayed in step 1056. Box 1057 ends the routine.

Figure 10F:
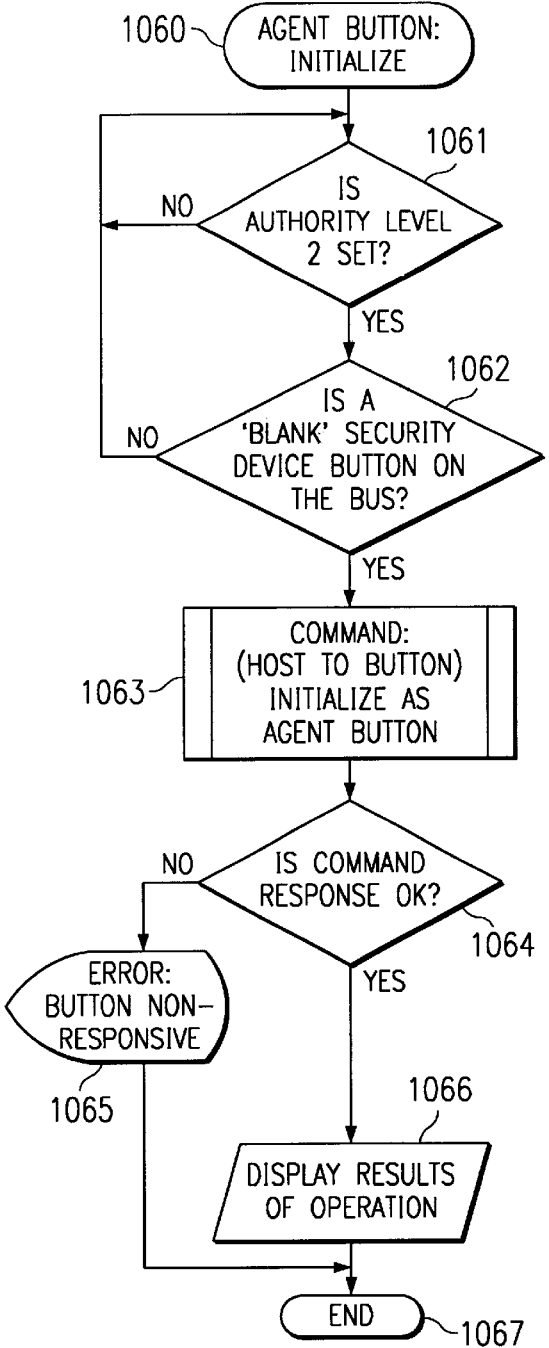

The agent button initialization operation is shown in FIG. 10F beginning at step 1060. The initialization command must first verify, in step 1061, its authority level is correct and set at two by the presence of a valid and password-unlocked master button, otherwise further agent initialization processing is prevented (step 1061). Provided this is the case, in step 1062, the agent initialization function must locate a "blank" button on the bus to proceed to step 1063, otherwise further agent initialization processing is prevented (step 1061). A blank button is defined as one which has pre-loaded operating instructions in its internal read only memory which are specific to the application outlined in this patent.

As explained above, the operating instructions must also be of the type of button being initialized. That is, those instructions for a postage button are somewhat different than those for a security device button necessitated by the gross differences in their operating behaviors and functions. When a button, postage or security device type, receives an initialization command from the host system 10, it must first have instructions in it to tell it what initialization means and what should be performed to accomplish this. Thus, as discussed above, it is the button that initializes itself after receiving a command from host system 10, not the host system 10 directly writing in memory locations within the button. The architecture of the button is such that outside influences can not directly change its operating instructions or memory. The host system for the button can only issue commands as defined in a narrow set of criteria to the button to make it perform a task such as initialization, credit or debit operations and repair of damaged memory.

In step 1063, the actual initialize command is issued from host system 10 to button and response of completed or not must return before time-out period as shown in step 1064, generating an error at step 1065 if command response not okay, otherwise proceeding to step 1066.

In step 1066, the positive or negative outcome is displayed on host system 10 display screen to the agent. The newly formatted agent button may now be removed from its holder and distributed to its new agent owner. Box 1067 ends the routine. The internal layout of data in RAM for an agent (or master) button is depicted in FIG. 13.

Referring back to FIG. 10A, and for the sake of further discussion and understanding of this POSTAGEMAKER button validation process, if a real-world situation presents itself where all three types of buttons: Agent, master and postage happen to be on the bus at the same time, the proper button is located by its response after a status query by the host system 10 running POSTAGEMAKER. Furthermore, the POSTAGEMAKER software has been designed in such a fashion that that button's physical position on the bus is not of importance. Once a button has been located and connected, its position on the bus could physically change with no effect to POSTAGEMAKER. This flexibility lends a certain forgiveness to order of log on of master or agent and distinguishing between the two and also between postage buttons and the master or agent.

Preferred Embodiment—Portable Processor Layout

Figure 11:
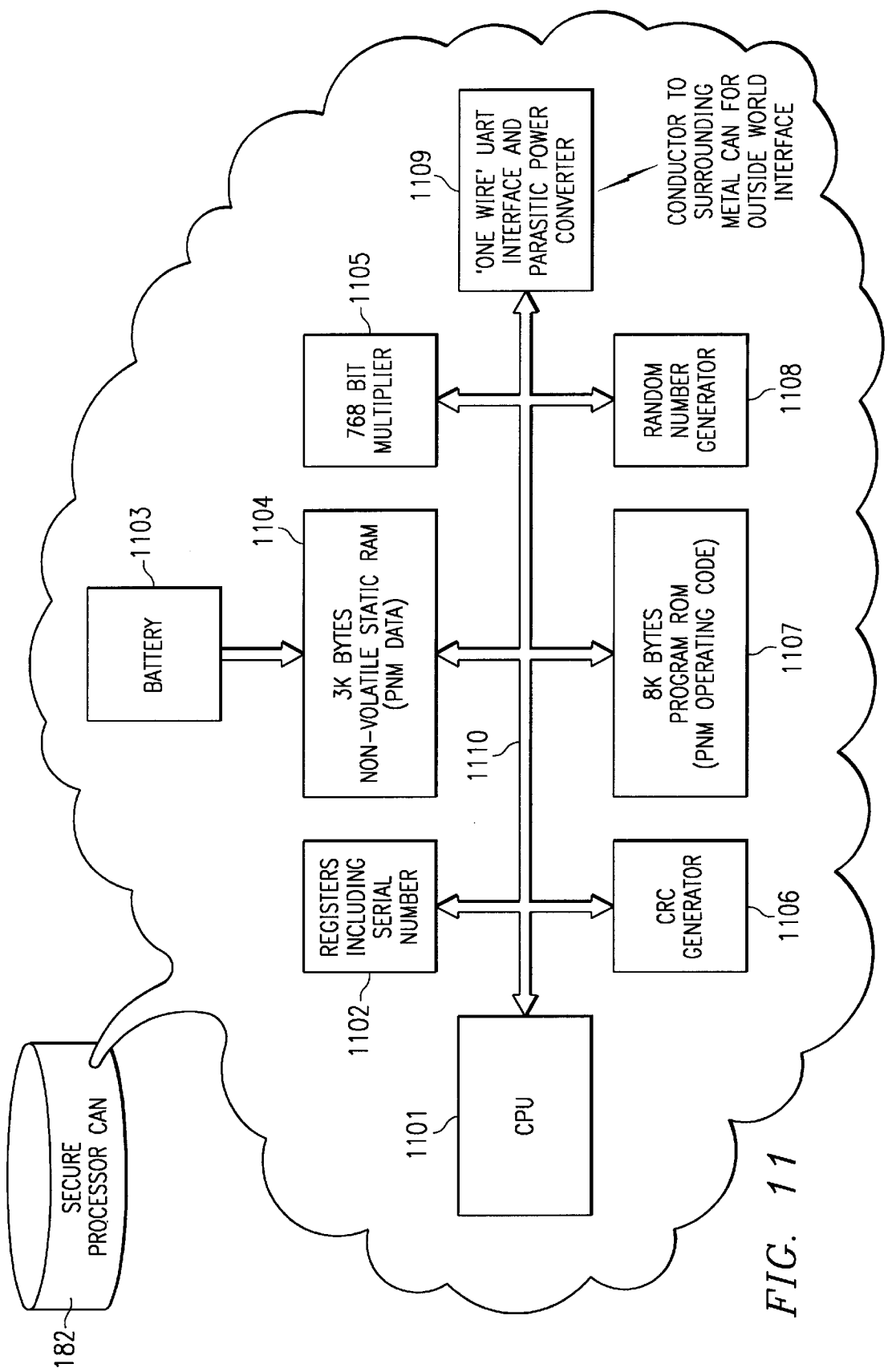
FIG. 11 illustrates the architecture for the preferred embodiment of the portable processor.

FIG. 11 depicts a functional layout of the Dallas Semiconductor "smart" button 182 which is the preferred embodiment of the portable postage dispensing device. The smart button is so called because of its button-like appearance and small size and built-in memory 1104, 1107 and processor (CPU) 1101. It is a microprocessor contained in a hermetically sealed metal can with several other "hybrid" components which make it even more useful in a secure environment.

Central processing unit (CPU) 1101 is a more efficient copy of the original 8051 microprocessor of Intel Corporation. Like most microprocessors, it executes instructions in sequence out of a memory, in this case, 8 Kbytes of read only memory (ROM) 1107. This sequence of instructions is sometimes known as a program or as operating code. Any process which has been programmed into a CPU will also require data to represent various control aspects of its task. Most of the data for the postage dispensing devices is kept in the 3 Kbytes of random access memory (RAM) which are non-volatile. Semiconductor RAM loses its contents once power is removed from it, thus its volatile nature. Where this unique device draws its power from will be discussed here below. However, in order to not lose the contents of the RAM between uses of the button, a small battery 1103 with a life of 10 years is present.

Included is a set of registers 1102 for various uses as discussed herein. In addition to the normal registers which are part of the 8051-like architecture of the smart button, there are several other general purpose registers which provide such features as timed access to particularly sensitive RAM locations (such as the location of a cryptographic key). Another register is used for sequence checking of the operating code of the smart button. The use of this feature is in making sure that the code is executing in the proper sequence and has not somehow jumped out of its normal path of execution because of an anomaly of programming or due to tampering. Another register is a real-time clock which gives the button self-sufficiency in knowing what the current time is relative to its expiration date and also as an unimpeachable (in the sense that it can not easily be externally tampered with) source of date stamping for the postage indicia.

Several other special features have been added just for use according to the present invention. There is a 768-bit multiplier circuit which can multiply two 768-bit operands in extremely high speed. The application of this is for the cryptographic chores which are necessary in secure communications between host system 10 and button 182. Another feature is random number generator 1108, also for cryptographic algorithm use. Another feature is a cyclic redundancy check (CRC) generator 1106 for use in communications to verify integrity of data received from the host system 10.

One feature, not specific to this system, but necessary all the same is a universal asynchronous receiver transmitter (UART) circuit 1109 for communication with the outside world. This UART makes contact with host systems via the metal case surrounding the smart button. This metal case must come in contact with an interface circuit bus which is ultimately connected to a host system 10 via means well known in the art. The UART takes care of the task of sending and receiving bytes of information and informing the CPU of its status.

Another function of this circuit is to take "Parasitic" power from the host interface. This parasitic power is the voltage and current actually used to give the CPU and other circuitry the power it needs to function at high speed without the need to draw on the internal battery for anything but keeping the contents of the RAM and the realtime clock register live. Bus 1110 connects all of the internal devices together so that they can function as a unit. The manner in which the UART and parasitic power are arranged to interface with the outside world, through the metal can of the processor is unique and leads to increased usability for the entire device.

Memory Layouts

FIG. 12 is the layout given to the 3K RAM in the preferred embodiment for a postage button. All registration identity, current balance and history logging data are stored in box 1201. Of course, where multiple credit registers are utilized as described above, the RAM layout may include multiple ones of particular entries (not shown), each associated with a particular credit register. Likewise, multiple ones of the non-volatile RAM (not shown) may be provided in the storage device.

FIG. 13 is the layout given to the 3K RAM in the preferred embodiment for a security device button such as an agent or master. As can be seen by comparison with FIG. 12, the security device is a similar, but limited subset of the postage memory definitions. There is just enough data in box 1301 to identify its owner and to provide logging services in order to better know how various buttons are being used.

Figure 14:
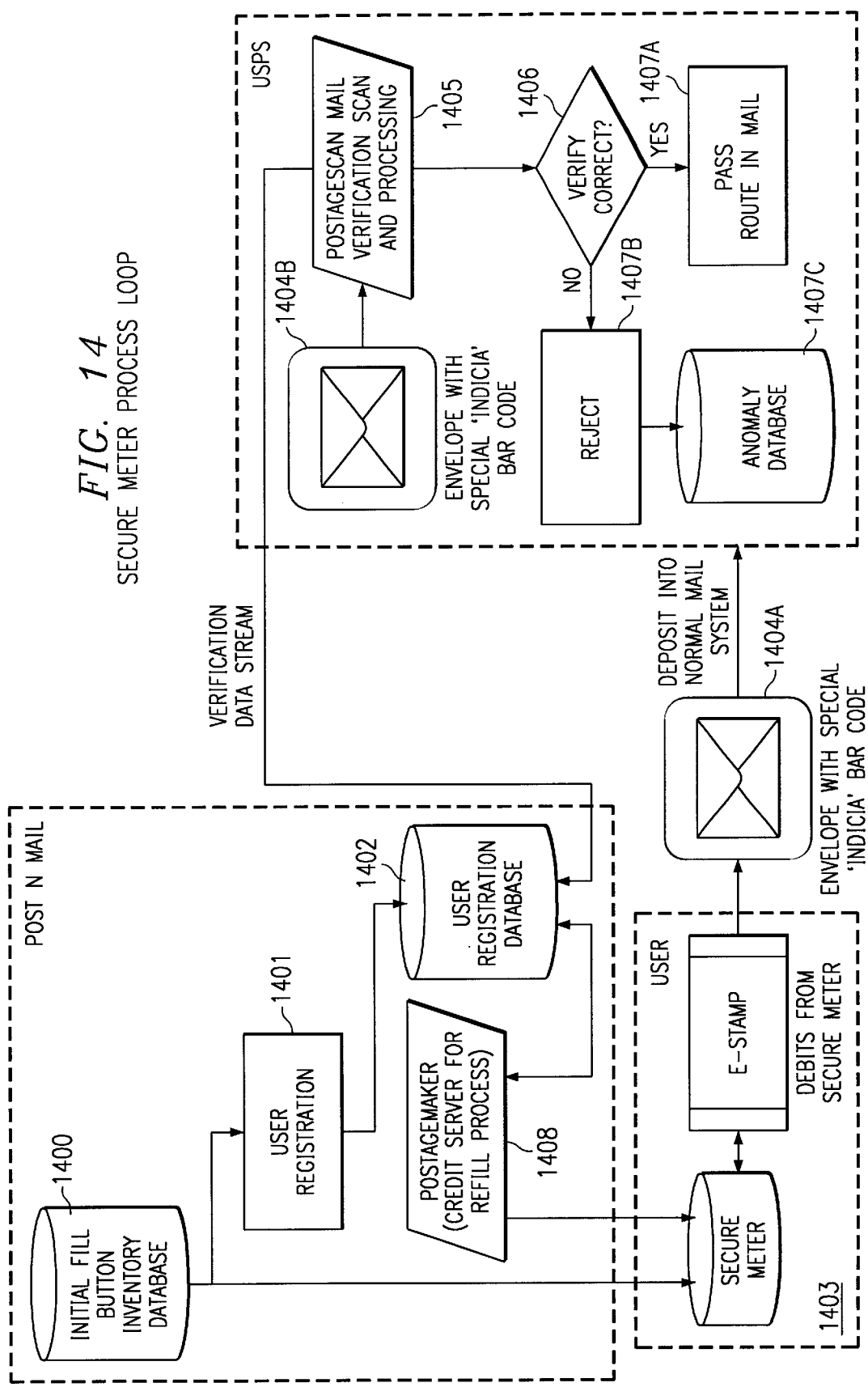
FIG. 14 shows the interrelationship of the database for registering memories assigned to users and the use of the database for verification purposes.

Referring now to FIG. 14, the process begins at step 1400 where a button is initially created and given a small token value. The button creation is marked by its entry into an "Initial Fill Button Inventory Database" simultaneously with its inclusion in a shrink-wrapped package of software to be shipped to users of the verification system. Once a given software package, button included, has been obtained by a potential user, he/she must fill out an electronic user registration form whose present embodiment is that of a "WINDOWS" program separate from the main program but included with it on the system installation disks. The registration program must be executed as part of the installation of the system before it can be used to issue postage. The process of the user filling out the form, sending it and the still-unregistered button back for registration to be scanned into the user registration database for registration is represented in step 1401 and step 1402. Also included in these steps is the removal of the button from the Initial Fill Button Inventory Database now that it is a valid registered postage dispensing device. In effect, the button, with its unique serial number, was moved from one inventory to another. Furthermore, as will be seen in future steps, the user registration database will be used for far more than just normal user registration of a software product.

In step 1403, the user has received back his/her button, now fully registered and therefore legal to use in postage transactions. The user inserts the storage device in its interface receptacle and invokes the system control program on the PC. Once a letter has been produced, with a certain amount of postage, this amount of postage is deducted from the amount stored in the portable processor (memory) by way of commands from E-STAMP. The postal indicia with its encrypted form of user information, postage amount, date, strike counter and other information is printed on a label for sticking to an envelope or actually printed on an envelope. At this point, the mail object is entered into the mail system of the shipping service provider in step 1401A.

In step 1404B, the article of mail has been gathered and sent to a central processing facility. In step 1405, the article of mail is scanned. The scan process first decodes the postal indicia or other authorization information, preferably using bar code scanning technology coupled with industrial automation, toward the goal of validation of the pre-paid rights or obligation to pay to send the article of mail. The system, in step 1406, uses a series of criteria and checks to accomplish this. Examples of criteria include, (but are not limited to): 1) Just the fact that the indicia, which was digitally signed in the secure environment of the storage device, can be decrypted gives a basic comfort level of validation; 2) Check against the central user database for validation of expiration date, expected balance of meter as of now and special flags for lost or stolen portable postage dispensers giving the capability to invalidate them much in the same way lost or stolen credit cards can be invalidated because of their validation against a central database.

If the article of mail passes, in step 1407A, the mail is routed to its normal destination. However, if the article of mail does not pass one of the tests, it is rejected to step 1407B where an entry is written in an anomaly database 1407C of items to be investigated.

The refill, step 1408, happens asynchronously to the rest of the steps, but is included, nevertheless, because of its contribution to the overall process loop. This is performed when a user has used most of the pre-paid credit on his/her storage device and must return the storage device to an authorized refill station, such as the United States Postal Service. The preferred embodiments may include simply a host processor-based system used by one authorized agent to serve walk-up clients or an automated process whereby storage devices are refill-processed in batches with little human interaction. In either case, the user provides his/her storage device to the authorized agent, along with prepayment in the form of check, credit card or private account. The storage device is credited with the prepayment amount using a PC which is executing to accomplish this in a secured and authorized environment. Once the storage device has been credited, it is returned to the user, who can then continue to freely use the system to issue postage until the next time the storage device must be refilled with pre-paid credits.

The other important contribution of the system is its updating of the central user database with information on renewed expiration date, user pre-paid balance, refilling station identification, etc. This information is invaluable in the validation step 1406.

As discussed above, the process loop gives the benefits of accounting and audit ability of pre-paid electronic postage to the adopting shipping service providers. Moreover, costs associated with collection of fees may be reduced because of guaranteed reimbursement by the trusted shipping service provider in one embodiment, or the prepayment of the fees directly to the shipping service providers in another embodiment. Additionally, these costs may be reduced due to their collection being simplified.

Furthermore, shipping service providers, by utilizing a common system, are given access to market segments, such as home and small businesses, which they might not otherwise reach, but which may be penetrated by another of the shipping service providers. The trusted shipping service provider may not only benefit monitarily, such as through collecting a percentage of the fees associated with other shipping service providers' services, but may also benefit by the ability to have their shipping services presented along with, and possibly in a favorable position on a display screen, other shipping service providers providing a service not commonly associated with the trusted shipping service provider. Likewise, the present invention allows all participating shipping service providers to present their alternatives for consideration by a user.

The present invention may also provide functionality such as identifying particular options which are restricted by law or otherwise. For example, existing United States Postal Service regulations forbid direct substitution of use of private carriers for certain type of mailings. The present invention may recognize situations potentially in violation of such regulations and alert a user or prevent printing of postage for a forbidden alternative.

While the invention has been shown to work in conjunction with a postal indicia system, it should be understood that the indicia is simply a printed form of a data packet produced by the cooperative effort of the PC and the portable processor. The data packet contains information that can be used for look up purposes in the database. Thus, the data packet can serve to authenticate any data stream coming from the PC or can be to authenticate itself, thereby granting a user certain privileges, based upon the authentication. For example, the data packet could be associated with airline tickets, either in printed form or in electronic form. In either event, the data packet associated with the document to be checked is authenticated to prove the authenticity of the accompanying data. As noted, the "other" data can be printed (the data packet would then be printed and scanned into the system) or the "other" data could be electronic (the data packet could then be electronic and read directly).

The aforementioned E-STAMP and POSTAGEMAKER programs have been shown and described with respect to a WINDOWS operating environment on a PC. Of course, other means could be employed for implementing the present invention within a host processor-based system.

Although described with reference to a preferred embodiment utilizing a portable memory device, it shall be understood that the present invention may operate without such a device. For example, a preferred embodiment of the present invention may communicate with a centralized storage device such as shown and described in the above referenced application entitled "SYSTEM AND METHOD FOR REMOTE POSTAGE METERING", previously incorporated herein by reference. Likewise, the postage credit may be stored within the host system such as shown and described in U.S. Pat. No. 5,682,318, entitled "SYSTEM AND METHOD FOR STORING POSTAGE IN A COMPUTER SYSTEM", incorporated herein by reference.

Although the present invention and its advantages have been described in detail, it should be understood that various changes, substitutions and alterations can be made herein without departing from the spirit and scope of the invention as defined by the appended claims.

What is claimed is:

1. A method operable on a general multi-purpose processor-based system for authorizing a desired transaction to be conducted utilizing a particular provider, wherein information with respect to said desired transaction as conducted by each of a plurality of providers is presented for selection of said particular provider, said method comprising the steps of:

coupling a storage device to said general multi-purpose processor-based system, wherein said storage device securely stores transaction authorization therein, wherein said transaction authorization is updated to reflect transactions authorized;

determining desired transaction parameters;

determining a value of said transaction associated with two or more of said plurality of providers utilizing ones of said transaction parameters;

presenting each of said determined values for comparison; and selecting said particular provider as a function of said comparison of said ones of said plurality of providers.

2. The method of claim 1, wherein said transaction authorization comprises a common credit value register for two or more providers of said plurality of providers.

3. The method of claim 1, wherein said transaction authorization comprises a unique credit value register for each provider of said plurality of providers.

4. The method of claim 1, wherein said transaction authorization comprises a credit value register and a transaction log of transactions authorized.

5. The method of claim 1, wherein the step of determining desired transaction parameters includes the step of:

accepting information associated with said transaction parameters from a user of said general multi-purpose processor-based system.

6. The method of claim 1, wherein said storage device is a TMU button.

7. The method of claim 1, wherein said storage device is selected from the group consisting of:

a smart card;

a PCMCIA card; and a smart disk.

8. The method of claim 1, wherein the step of determining desired transaction parameters includes the step of:

accepting information associated with said transaction parameters from a general purpose computer program operating on said general multi-purpose processor-based system.

9. The method of claim 8, wherein the general purpose computer program is selected from the group consisting of:

a word processor;

a database;

a spread sheet; and an accounting system.

10. The method of claim 1, further comprising the step of:

limiting access to said storage device to only authorized general multi-purpose processor-based systems.

11. The method of claim 10, wherein said authorized general multi-purpose processor-based systems include an authorized general multi-purpose processor-based system coupled locally to said storage device and an authorized general multi-purpose processor-based system coupled remotely to said storage device.

12. The method of claim 1, further comprising the step of:

printing authorization information acceptable by said particular provider in conducting said transaction.

13. The method of claim 12, wherein said authorization information includes data from which said particular provider may verify prepayment of said transaction value.

14. The method of claim 13, wherein said authorization information includes a graphical security indicia.

15. The method of claim 1, wherein said transaction is associated with the transportation of a particular item.

16. The method of claim 15, further comprising the step of:

automatically determining a weight of said particular item, wherein said transaction parameters utilized to determine said transaction value includes said automatically determined weight.

17. The method of claim 15, wherein the step of determining desired transaction parameters includes the step of:

accepting shipping information associated with the transportation of said particular item.

18. The method of claim 17, wherein said shipping information includes information selected from the group consisting of:

delivery location information;

origination location information;

item weight;

urgency information; and item class information.

19. The method of claim 15, further comprising the step of:

automatically determining a weight of said particular item, wherein said weight determination is based at least in part on item generation information provided by a coupled process utilized in creating the item.

20. The method of claim 19, wherein said coupled process is a word processor.

21. A general multi-purpose processor-based system for authorizing a desired transaction to be conducted utilizing a particular provider, wherein information with respect to said desired transaction as conducted by each of a plurality of providers is presented for selection of said particular provider, said system comprising:

means for determining parameters with respect to said desired transaction;

means for determining a value of said transaction associated with two or more of said plurality of providers utilizing ones of said transaction parameters;

means for presenting each of said determined values for comparison;

means for selecting said particular provider as a function of said comparison of said ones of said plurality of providers; and means for printing authorization information acceptable by said particular provider in conducting said transaction.

22. The system of claim 21, wherein said authorization information includes data from which said particular provider may collect payment of said transaction value.

23. The system of claim 21, wherein said means for determining desired transaction parameters comprises:

means for accepting information associated with said transaction parameters from a general purpose computer program operating on said general multi-purpose processor-based system.

24. The system of claim 21, wherein said authorization information includes data from which said particular provider may verify prepayment of said transaction value.

25. The system of claim 24, wherein said authorization information includes a graphical security indicia.

26. The system of claim 21, further comprising:

a storage device securely storing an amount of credit value therein;

means for coupling said storage device to said general multi-purpose processor-based system, wherein said general multi-purpose processor-based system may interact with said storage device to retrieve a portion of said amount of credit value stored therein.

27. The system of claim 26, wherein said storage device includes a plurality of registers, wherein a plurality of discrete credit values are stored in said plurality of registers.

28. The system of claim 21, further comprising:
means for incrementing a credit value utilized in printing said authorization information.

29. The system of claim 28, wherein said incrementing means is operable by a trusted one of said plurality of providers and wherein said incrementing means comprises:
means for retrieving information from said storage device regarding transactions authorized by said system; and
means for determining amounts due ones of said providers from said stored authorized transaction information.

30. The system of claim 21, further comprising:
means for storing a transaction log including records associated with the printing of authorization information of at least one of said plurality of providers.

31. The system of claim 30, wherein said transaction log is stored in mass storage device of said general multi-purpose processor-based system.

32. The system of claim 30, wherein said transaction log is stored in a secure portable storage device removably coupled to said general multi-purpose processor-based system.

33. The system of claim 21, wherein said transaction is associated with the transportation of a particular item.

34. The system of claim 33, further comprising:
means for automatically determining a weight of said particular item, wherein said transaction information utilized to determine said transaction value includes said automatically determined weight.

35. The system of claim 33, wherein said transaction parameters include information selected from the group consisting of:
delivery location information;
origination location information;
item weight;
urgency information; and
item class information.

36. The system of claim 33, further comprising the step of:
automatically determining a weight of said particular item, wherein said weight determination is based at least in part on item generation information provided by a coupled process utilized in creating the item.

37. The system of claim 36, wherein said coupled process is a word processor.

38. A system for retrievably storing transaction information for a plurality of transactions, wherein ones of said plurality of transactions are associated with different transaction facilitators of a plurality of transaction facilitators, said system comprising:
a memory for storing transaction information, wherein the memory is contained within the secure confines of a portable package also including a processor restricting access to said memory;
at least one input device accepting information input regarding aspects of a desired transaction;
a processor-based system in information communication with said memory and said at least one input device, said processor-based system including circuitry interfaced so as to receive said desired transaction information input into said processor based-system, wherein said processor-based system is a general multi-purpose processor based system and said circuitry is defined at least in part bv a computer program operating thereon, wherein said circuitry operates to determine information specific to ones of the plurality of facilitators conducting a transaction as a function of said desired transaction aspects, and wherein the portable package of the memory is removably coupled to said processor-based system to provide said information communication;
at least one interface device accepting said information specific to ones of the plurality of facilitators and presenting said accepted information specific to ones of the plurality of facilitators for selection of a particular one of said facilitators to conduct a transaction as a function of said desired transaction aspects; and
a printer coupled to said processor-based system adapted to print information authorizing said particular one of said facilitators to conduct a transaction as a function of said desired transaction aspects.

39. The system of claim 38, wherein said transaction information includes a value credit decremented in an amount corresponding to said particular one of said facilitators conducting a transaction as a function of said desired transaction aspects before said printer is enabled to print said information authorizing said particular one of said facilitators to conduct a transaction.

40. The system of claim 38, wherein said transaction information includes a record incremented in an amount corresponding to said particular one of said facilitators conducting a transaction as a function of said desired transaction aspects before said printer is enabled to print said information authorizing said particular one of said facilitators to conduct a transaction.

41. The system of claim 38, wherein said information authorizing said particular one of said facilitators to conduct a transaction is printed in a format selected from the group consisting of:
an authorizing indicia;
a way bill;
a manifest; and
a bill of lading.

42. A system for selecting a particular shipping service provider of a plurality of shipping service providers and printing an authorization for shipping an item via said particular shipping service provider, said system comprising:
a first processor device storing an amount of credit suitable for use in authorizing shipment of said item;
a second processor device having an interface adapted for coupling with said first processor device and for providing information communication there between, wherein said second processor device includes a user interface adapted to interface with a user to accept input associated with said shipment of said item, and wherein said second processor device includes circuitry coupled to said user interface adapted to determine a shipping rate associated with ones of said shipping service providers as a function of said input associated with said shipment of said item and to present said determined shipping rates to said user for selection of said particular shipping service provider, wherein said circuitry communicates at least said shipping rate associated with said particular shipping service provider to said first processor for decrementing said shipping rate associated with said particular shipping service provider from said amount of credit prior to printing an authorization for shipping said item;

wherein determination of said shipping rates of at least one shipping service provider of said plurality of shipping service providers includes reference to a discrete database for said at least one shipping service provider; and wherein said discrete database is remote to said first processor device.

43. The system of claim 42, wherein said input associated with said shipment of said item includes information selected from the group consisting of:

a weight of said item;

sender urgency information;

a shipping distance;

a zone from which said item is to be shipped; and a zone to which said item is to be shipped.

44. The system of claim 42, wherein said discrete database is stored on a device selected from the group consisting of:

a CD ROM;

a hard disk drive;

a floppy disk drive;

RAM; and a portable memory.

45. The system of claim 42, wherein said first processor device is coupled to said remote database through an information communication link selected from the group consisting of:

a LAN;

a WAN;

the Internet; and a public switched network.

46. The system of claim 42, wherein said circuitry of said first processor device prevents printing said authorization for shipping said item for a particular one of said shipping service providers wherein shipment of said item according to said input associated with said shipment of said item is prohibited.

47. The system of claim 42, wherein said second processor device comprises a general multi-purpose processor based system.

* * * * *